(12) United States Patent
Lee

(10) Patent No.: US 12,206,849 B2
(45) Date of Patent: *Jan. 21, 2025

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,604

(22) Filed: Sep. 20, 2023

(65) Prior Publication Data

US 2024/0015287 A1    Jan. 11, 2024

Related U.S. Application Data

(62) Division of application No. 17/366,356, filed on Jul. 2, 2021, now Pat. No. 11,812,016, which is a division
(Continued)

(30) Foreign Application Priority Data

Sep. 20, 2016 (KR) .................. 10-2016-0120082
Oct. 4, 2016 (KR) .................. 10-2016-0127861

(51) Int. Cl.
*H04N 19/119* (2014.01)
*H04N 19/129* (2014.01)
(Continued)

(52) U.S. Cl.
CPC ......... *H04N 19/119* (2014.11); *H04N 19/129* (2014.11); *H04N 19/132* (2014.11);
(Continued)

(58) Field of Classification Search
CPC ............... H04N 19/119; H04N 19/129; H04N 19/132; H04N 19/174; H04N 19/176;
(Continued)

(56) References Cited

U.S. PATENT DOCUMENTS 10,523,967 B2    12/2019  Lee et al.
10,764,583 B2 *   9/2020  Lee .................. H04N 19/103
(Continued)

FOREIGN PATENT DOCUMENTS

CN        102685477 A     9/2012
CN        102870414 A     1/2013
(Continued)

OTHER PUBLICATIONS

China National Intellectual Property Administration, Office Action of corresponding CN Patent Application No. 201780057325.5, Jan. 6, 2021.
(Continued)

*Primary Examiner* — Zaihan Jiang
(74) *Attorney, Agent, or Firm* — IP Legal Services, LLC

(57) ABSTRACT

A method for decoding a video according to the present invention may comprise: determining merge target candidate blocks of a current coding block, specifying at least one among the merge target candidate blocks, and generating a merged block by merging the specified merge target candidate block and the current coding block.

4 Claims, 14 Drawing Sheets

Related U.S. Application Data of application No. 16/334,996, filed as application No. PCT/KR2017/010355 on Sep. 20, 2017, now Pat. No. 11,095,892.

(51) Int. Cl.

| | |
|---|---|
| *H04N 19/132* | (2014.01) |
| *H04N 19/174* | (2014.01) |
| *H04N 19/176* | (2014.01) |
| *H04N 19/182* | (2014.01) |
| *H04N 19/186* | (2014.01) |
| *H04N 19/30* | (2014.01) |
| *H04N 19/44* | (2014.01) |
| *H04N 19/50* | (2014.01) |
| *H04N 19/597* | (2014.01) |
| *H04N 19/91* | (2014.01) |
| *H04N 19/96* | (2014.01) |

(52) U.S. Cl.
CPC ......... *H04N 19/174* (2014.11); *H04N 19/176* (2014.11); *H04N 19/182* (2014.11); *H04N 19/186* (2014.11); *H04N 19/30* (2014.11); *H04N 19/44* (2014.11); *H04N 19/50* (2014.11); *H04N 19/597* (2014.11); *H04N 19/91* (2014.11); *H04N 19/96* (2014.11)

(58) Field of Classification Search
CPC .... H04N 19/182; H04N 19/186; H04N 19/30; H04N 19/44; H04N 19/50; H04N 19/597; H04N 19/91; H04N 19/96
See application file for complete search history.

(56) References Cited

U.S. PATENT DOCUMENTS

| | | | |
|---|---|---|---|
| 2011/0206123 A1* | 8/2011 | Panchal | ............... H04N 19/147 |
| | | | 375/E7.243 |
| 2011/0292994 A1 | 12/2011 | Lim et al. | |
| 2012/0008676 A1 | 1/2012 | Lee et al. | |
| 2012/0263235 A1 | 10/2012 | Sugio et al. | |
| 2013/0089265 A1 | 4/2013 | Yie et al. | |
| 2013/0107959 A1 | 5/2013 | Park et al. | |
| 2013/0108182 A1 | 5/2013 | Yie et al. | |
| 2013/0129237 A1 | 5/2013 | Yie et al. | |
| 2013/0136175 A1 | 5/2013 | Wang et al. | |
| 2013/0136183 A1 | 5/2013 | Kim et al. | |
| 2013/0148735 A1 | 6/2013 | Kim et al. | |
| 2013/0163664 A1 | 6/2013 | Guo et al. | |
| 2013/0279577 A1 | 10/2013 | Schwarz et al. | |
| 2014/0029670 A1 | 1/2014 | Kung et al. | |
| 2014/0105291 A1 | 4/2014 | Nakamura et al. | |
| 2014/0153641 A1 | 6/2014 | Kim et al. | |
| 2014/0211857 A1 | 7/2014 | Sugio et al. | |
| 2014/0254674 A1 | 9/2014 | Lee et al. | |
| 2014/0254675 A1 | 9/2014 | Lee et al. | |
| 2014/0269915 A1 | 9/2014 | Lee et al. | |
| 2014/0286395 A1 | 9/2014 | Lee et al. | |
| 2014/0286428 A1 | 9/2014 | Lee et al. | |
| 2014/0286430 A1 | 9/2014 | Lee et al. | |
| 2014/0286431 A1 | 9/2014 | Lee et al. | |
| 2014/0286432 A1 | 9/2014 | Kim et al. | |
| 2014/0294082 A1 | 10/2014 | Lee et al. | |
| 2014/0314143 A1 | 10/2014 | Lee et al. | |
| 2014/0355687 A1 | 12/2014 | Takehara et al. | |
| 2014/0376626 A1 | 12/2014 | Lee | |
| 2015/0010079 A1 | 1/2015 | Yie et al. | |
| 2015/0010080 A1 | 1/2015 | Yie et al. | |
| 2015/0010081 A1 | 1/2015 | Yie et al. | |
| 2015/0010085 A1 | 1/2015 | Yie et al. | |
| 2015/0010086 A1 | 1/2015 | Yie et al. | |
| 2015/0010243 A1 | 1/2015 | Yie et al. | |
| 2015/0010244 A1 | 1/2015 | Yie et al. | |
| 2015/0016737 A1 | 1/2015 | Yie et al. | |
| 2015/0016738 A1 | 1/2015 | Yie et al. | |
| 2015/0016739 A1 | 1/2015 | Yie et al. | |
| 2015/0016740 A1 | 1/2015 | Yie et al. | |
| 2015/0016741 A1 | 1/2015 | Yie et al. | |
| 2015/0036748 A1 | 2/2015 | Sugio et al. | |
| 2015/0063446 A1 | 3/2015 | Sugio et al. | |
| 2015/0078438 A1 | 3/2015 | Lim et al. | |
| 2015/0124886 A1 | 5/2015 | Kim et al. | |
| 2015/0124887 A1 | 5/2015 | Kim et al. | |
| 2015/0131733 A1 | 5/2015 | Kim et al. | |
| 2015/0139306 A1 | 5/2015 | Lee et al. | |
| 2015/0139307 A1 | 5/2015 | Lee et al. | |
| 2015/0146775 A1 | 5/2015 | Lee et al. | |
| 2015/0146783 A1 | 5/2015 | Sugio et al. | |
| 2015/0163494 A1 | 6/2015 | Park et al. | |
| 2015/0195566 A1 | 7/2015 | Hinz et al. | |
| 2015/0208091 A1 | 7/2015 | Yie et al. | |
| 2015/0237324 A1 | 8/2015 | Zhang et al. | |
| 2015/0256841 A1 | 9/2015 | Yie et al. | |
| 2015/0264352 A1 | 9/2015 | Yie et al. | |
| 2015/0281688 A1 | 10/2015 | Yie et al. | |
| 2015/0326863 A1 | 11/2015 | Francois et al. | |
| 2015/0382014 A1 | 12/2015 | Kim et al. | |
| 2016/0044310 A1 | 2/2016 | Park et al. | |
| 2016/0134891 A1 | 5/2016 | Lee et al. | |
| 2016/0156910 A1 | 6/2016 | Lee et al. | |
| 2016/0156934 A1 | 6/2016 | Lee et al. | |
| 2016/0227243 A1 | 8/2016 | Cho | |
| 2016/0227253 A1 | 8/2016 | Sato | |
| 2016/0249054 A1 | 8/2016 | Park et al. | |
| 2016/0309179 A1 | 10/2016 | Schwarz et al. | |
| 2016/0316208 A1 | 10/2016 | Lee et al. | |
| 2016/0316209 A1 | 10/2016 | Lee et al. | |
| 2016/0330454 A1 | 11/2016 | Lim et al. | |
| 2016/0337660 A1 | 11/2016 | Sugio et al. | |
| 2017/0026643 A1 | 1/2017 | Lee et al. | |
| 2017/0026644 A1 | 1/2017 | Lee et al. | |
| 2017/0094314 A1* | 3/2017 | Zhao | .................... H04N 19/625 |
| 2017/0099502 A1 | 4/2017 | Lee et al. | |
| 2017/0099503 A1 | 4/2017 | Lee et al. | |
| 2017/0099504 A1 | 4/2017 | Lee et al. | |
| 2017/0118467 A1 | 4/2017 | Lee | |
| 2017/0142422 A1 | 5/2017 | Park et al. | |
| 2017/0223380 A1 | 8/2017 | Lee et al. | |
| 2017/0280150 A1 | 9/2017 | Sugio et al. | |
| 2017/0347095 A1 | 11/2017 | Panusopone et al. | |
| 2017/0366821 A1 | 12/2017 | Schwarz et al. | |
| 2018/0014027 A1 | 1/2018 | Kim et al. | |
| 2018/0070079 A1 | 3/2018 | Lee | |
| 2018/0070090 A1 | 3/2018 | Lee et al. | |
| 2018/0103264 A1 | 4/2018 | Sugio et al. | |
| 2018/0124416 A1 | 5/2018 | Sugio et al. | |
| 2018/0131945 A1 | 5/2018 | Park et al. | |
| 2018/0184111 A1 | 6/2018 | Schwarz et al. | |
| 2018/0227582 A1 | 8/2018 | Park et al. | |
| 2018/0249146 A1 | 8/2018 | Zhang et al. | |
| 2018/0255298 A1 | 9/2018 | Lee | |
| 2018/0302642 A1 | 10/2018 | Schwarz et al. | |
| 2018/0332285 A1 | 11/2018 | Lee et al. | |
| 2018/0332294 A1 | 11/2018 | Lim et al. | |
| 2019/0058896 A1 | 2/2019 | Huang et al. | |
| 2019/0068966 A1 | 2/2019 | Lee | |
| 2019/0075314 A1 | 3/2019 | Sugio et al. | |
| 2019/0124336 A1 | 4/2019 | Park et al. | |
| 2019/0132607 A1 | 5/2019 | Sugio et al. | |
| 2019/0132608 A1 | 5/2019 | Sugio et al. | |
| 2019/0215524 A1* | 7/2019 | Lee | ........................ H04N 19/46 |
| 2019/0246132 A1 | 8/2019 | Sugio et al. | |
| 2019/0349591 A1 | 11/2019 | Park et al. | |
| 2019/0373268 A1 | 12/2019 | Lim et al. | |
| 2020/0195922 A1 | 6/2020 | Lee | |
| 2020/0195954 A1 | 6/2020 | Sugio et al. | |
| 2020/0204816 A1 | 6/2020 | Yamamoto et al. | |
| 2020/0244967 A1 | 7/2020 | Park et al. | |
| 2020/0244984 A1 | 7/2020 | Sugio et al. | |
| 2020/0344485 A1 | 10/2020 | Lim et al. | |
| 2021/0037241 A1 | 2/2021 | Lee | |

(56) References Cited

U.S. PATENT DOCUMENTS

| | | | | |
|---|---|---|---|---|
| 2021/0051332 A1* | 2/2021 | Karczewicz | ......... | H04N 19/124 |
| 2021/0076078 A1* | 3/2021 | Lee | ........................ | H04N 19/46 |
| 2021/0281848 A1* | 9/2021 | Lee | ...................... | H04N 19/176 |

FOREIGN PATENT DOCUMENTS

| | | | |
|---|---|---|---|
| CN | 103891283 | A | 6/2014 |
| CN | 104081770 | A | 10/2014 |
| CN | 104378638 | A | 2/2015 |
| CN | 104396245 | A | 3/2015 |
| CN | 104685874 | A | 6/2015 |
| CN | 105141949 | A | 12/2015 |
| CN | 105325002 | A | 2/2016 |
| CN | 105594208 | A | 5/2016 |
| KR | 10-2014-0049098 | A | 4/2014 |
| KR | 10-2014-0066146 | A | 5/2014 |
| KR | 10-2014-0077928 | A | 6/2014 |
| KR | 10-2014-0105038 | A | 9/2014 |
| KR | 10-2014-0119823 | A | 10/2014 |
| KR | 10-2016-0037246 | A | 4/2016 |
| KR | 10-2016-0041030 | A | 4/2016 |
| KR | 10-2016-0085237 | A | 7/2016 |
| KR | 10-1653274 | B1 | 9/2016 |
| WO | 2012/140821 | A1 | 10/2012 |
| WO | WO-2013096772 | * | 12/2012 |
| WO | 2013/051209 | A1 | 4/2013 |
| WO | 2013/096772 | A2 | 6/2013 |
| WO | WO-2014001547 | * | 6/2013 |
| WO | 2014/001547 | A2 | 1/2014 |
| WO | 2015/123806 | A1 | 8/2015 |

OTHER PUBLICATIONS

Zhang Renjun, "The Research of Motion Estimation Based on H.264/AVC Video Coding", China Master's Theses Full-text Database, Feb. 15, 2014.

China National Intellectual Property Administration, Office Action of corresponding CN Patent Application No. 201780057325.5, Aug. 11, 2021.

China National Intellectual Property Administration, Office Action of corresponding CN Patent Application No. 202210312675.4, Jul. 9, 2024.

* cited by examiner

Nx2N

2NxN nLx2N nRx2N

2NxnU

2NxnD

2N×2N   N×2N   2N×N   N×N nL×2N   nR×2N   2N×nU   2N×nD

PART_2Nx2N   PART_Nx2N   PART_2NxN   PART_NxN

PART_nLx2N   PART_nRx2N   PART_2NxnU   PART_2NxnD

Units including 256 samples

Units including 1,024 samples

0 = diagonal

1 = horizontal

2 = vertical

0 = diagonal

1 = horizontal

2 = vertical

METHOD AND APPARATUS FOR PROCESSING VIDEO SIGNAL

CROSS REFERENCE TO RELATED APPLICATIONS

This application is a Divisional of U.S. patent application Ser. No. 17/366,356 (filed on Jul. 2, 2021), which is a Divisional of U.S. patent application Ser. No. 16/334,996 (filed on Mar. 20, 2019), now issued as U.S. Pat. No. 11,095,892, which is a National Stage Patent Application of PCT International Patent Application No. PCT/KR2017/010355 (filed on Sep. 20, 2017) under 35 U.S.C. § 371, which claims priority to Korean Patent Application Nos. 10-2016-0120082 (filed on Sep. 20, 2016) and 10-2016-0127861 (filed on Oct. 4, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently splitting/merging an encoding/decoding target block in encoding/decoding a video signal.

An object of the present invention is to provide a method and an apparatus for merging two blocks in which a division is completed and performing a prediction or a transform based on the merged block in encoding/decoding a video signal.

An object of the present invention is to provide a method and apparatus for performing a transform by dividing or converting a block of non-square shape into a block of square shape in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may determine merge target candidate blocks of a current coding block, specify at least one among the merge target candidate blocks, and generate a merged block by merging the specified merge target candidate block and the current coding block.

A method and an apparatus for encoding a video signal according to the present invention may determine merge target candidate blocks of a current coding block, specify at least one among the merge target candidate blocks, and generate a merged block by merging the specified merge target candidate block and the current coding block.

In the method and the apparatus for encoding/decoding a video signal according to the present invention, a plurality of coding blocks included in the merged block may have same motion information or have a same intra prediction mode.

In the method and the apparatus for encoding/decoding a video signal according to the present invention, a plurality of coding blocks included in the merged block may have a same transform type.

In the method and the apparatus for encoding/decoding a video signal according to the present invention, the transform type may comprise at least one of a transform scheme or a transform mode.

In the method and the apparatus for encoding/decoding a video signal according to the present invention, the merge target candidate blocks may comprise at least one of neighboring blocks adjacent to the current coding block.

In the method and the apparatus for encoding/decoding a video signal according to the present invention, whether a neighboring block is available to be used as the merge target candidate block or not may be determined based on at least one of a height, a width or a size of the current coding block and the neighboring coding block.

In the method and the apparatus for encoding/decoding a video signal according to the present invention, merging the current coding block and the merge target candidate block may be allowed only when a size or a shape of the current coding block satisfies a pre-defined condition.

The features briefly summarized above for the present invention are only illustrative aspects of the detailed description of the invention that follows, but do not limit the scope of the invention.

Advantageous Effects

According to the present invention, encoding/decoding efficiency can be improved by efficiently splitting/merging an encoding/decoding target block. According to the present invention, encoding/decoding efficiency can be improved by merging two blocks in which a division is completed and performing a prediction or a transform based on the merged block.

According to the present invention, encoding/decoding efficiency can be improved by performing a transform after dividing or converting a block of a non-square shape into a block of square shape.

The effects obtainable by the present invention are not limited to the above-mentioned effects, and other effects not mentioned can be clearly understood by those skilled in the art from the description below.

MODE FOR INVENTION

Figure 1:
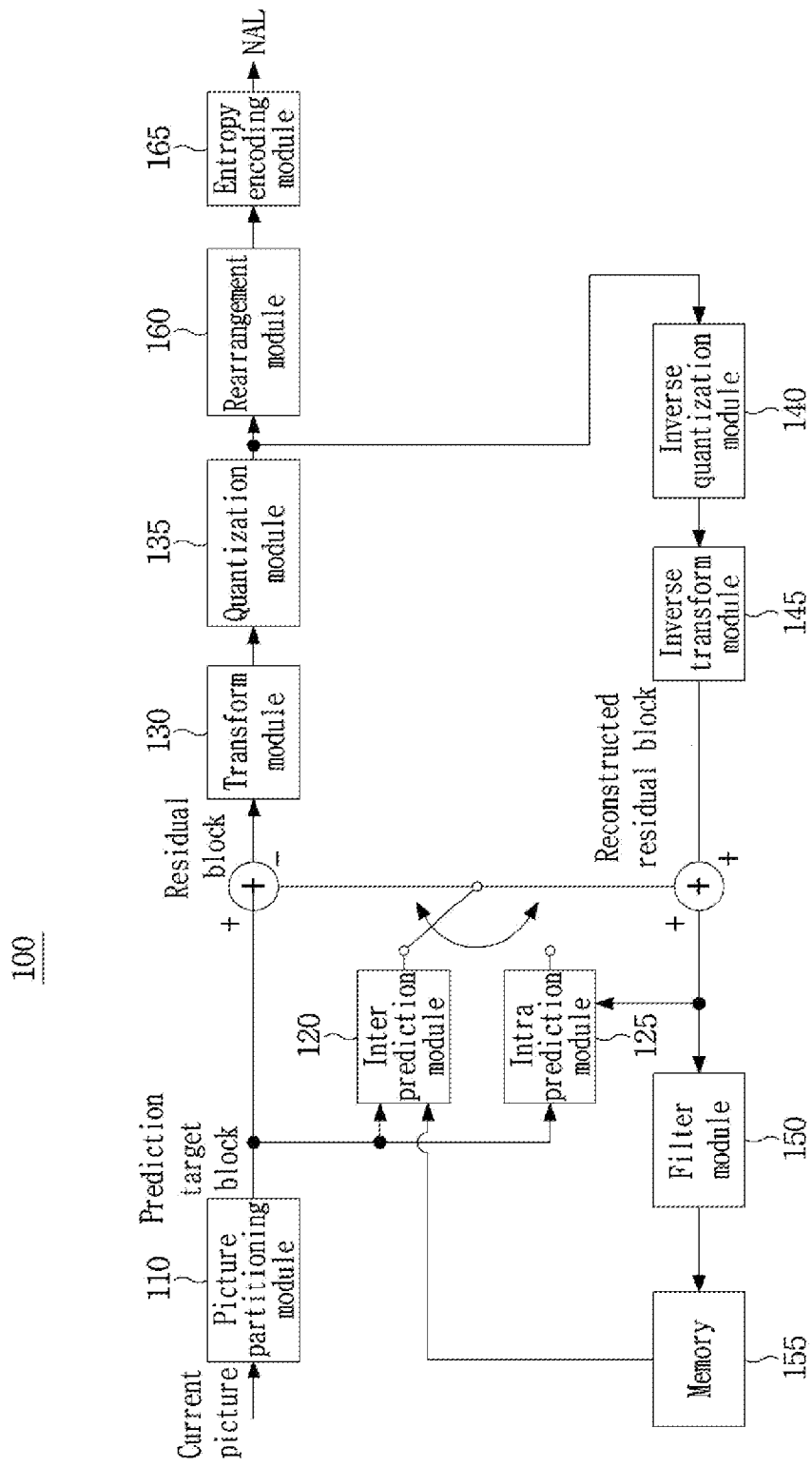
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
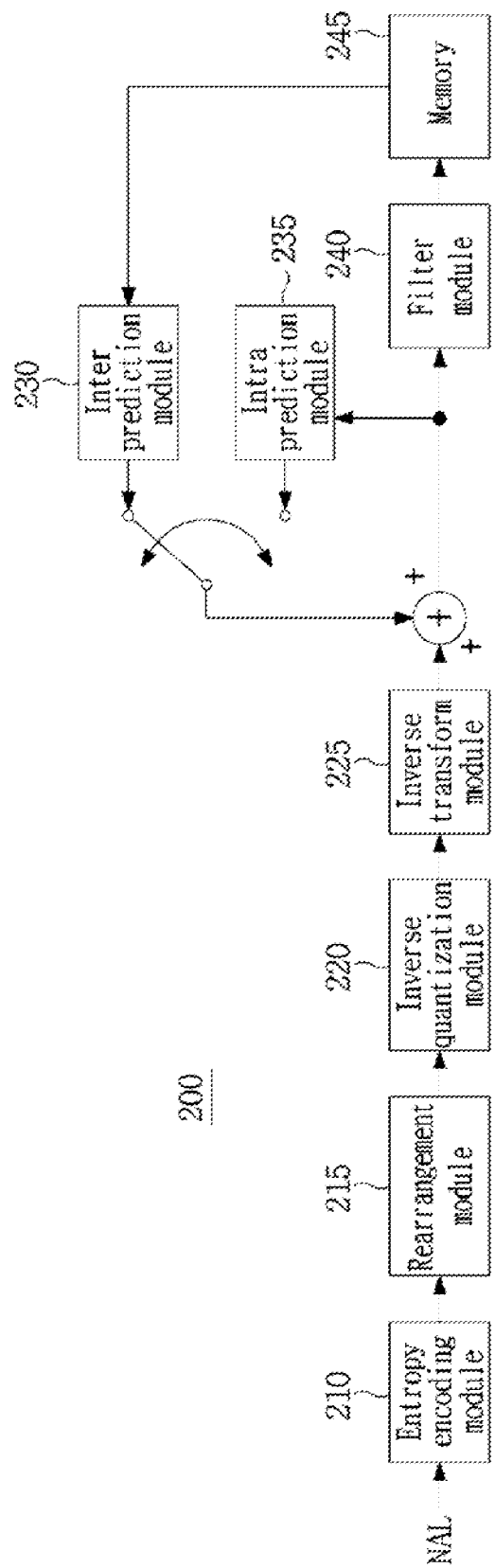
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
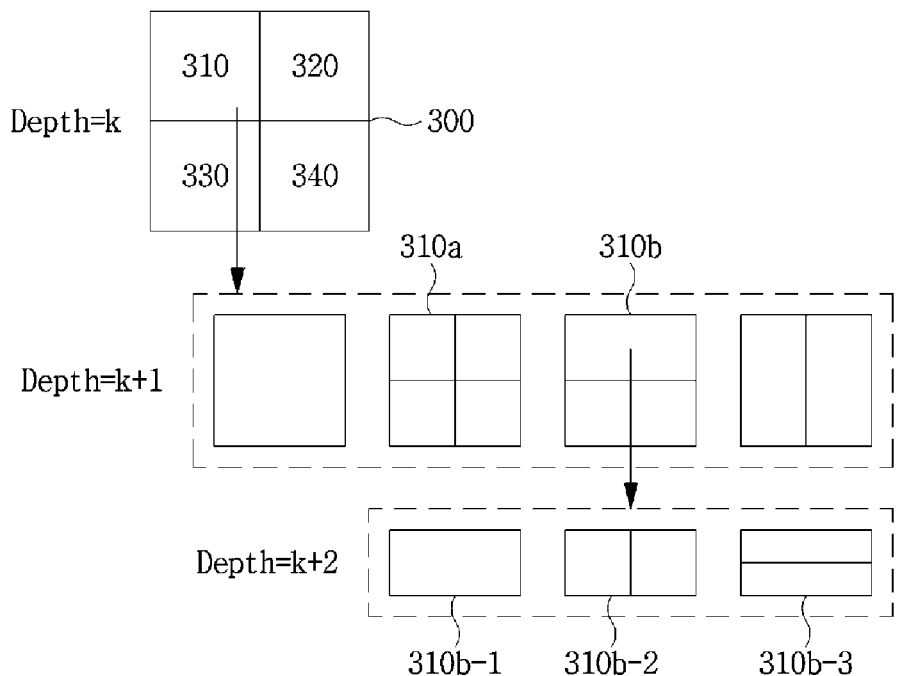
FIG. 3 is a diagram illustrating an example of hierarchically partitioning a coding block based on a tree structure according to an embodiment of the present invention.
Figure 4:
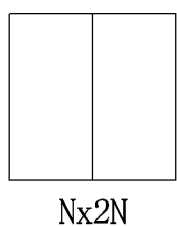
FIG. 4 is a diagram illustrating a partition type in which binary tree-based partitioning is allowed according to an embodiment of the present invention.
Figure 4:
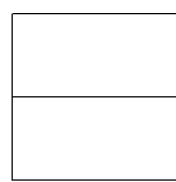
Figure 4:
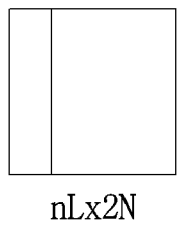
Figure 4:
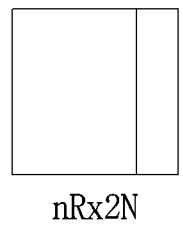
Figure 4:
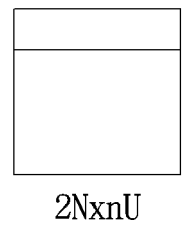
Figure 4:
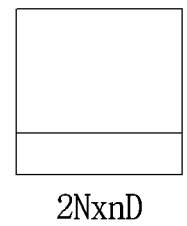

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. In addition, the coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
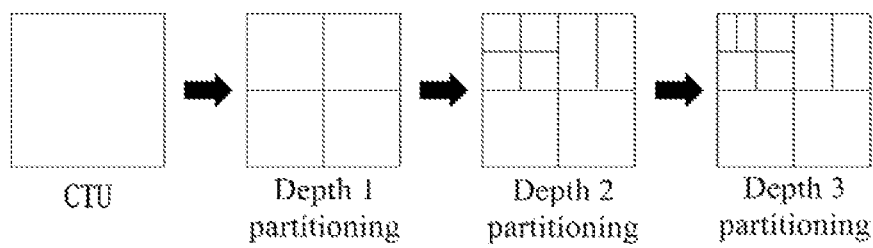
FIGS. 5A and 5B are diagrams illustrating an example in which only a binary tree-based partition of a pre-determined type is allowed according to an embodiment of the present invention.
Figure 5B:
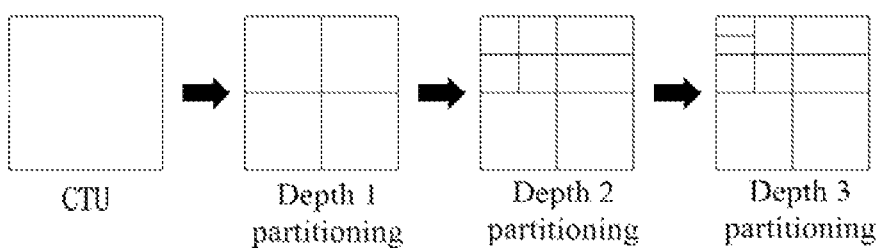

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction, a horizontal direction, or the like may be used. For example, quad_split_flag indicates whether the coding block is divided into four coding blocks, and binary_split_flag indicates whether the coding block is divided into two coding blocks. When the coding block is divided into two coding blocks, is_hor_split_flag indicating whether a partitioning direction of the coding block is a vertical direction or a horizontal direction may be signaled.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in units of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 6:
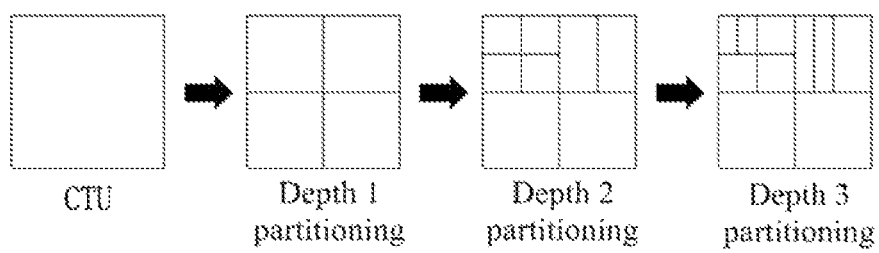
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

As a result of a division based on the quadtree and the binary tree, a coding block which is not further partitioned can be used as a prediction block or a transform block. That is, in a QTBT partitioning method based on a quad tree and binary tree, a coding block may become a prediction block and a prediction block may become a transform block. For example, when the QTBT partitioning method is used, a prediction image may be generated in a unit of a coding block, and a residual signal, which is a difference between an original image and the prediction image, is transformed in a unit of a coding block. Here, generating the prediction image in a unit of a coding block may mean that motion information is determined for a coding block or an intra prediction mode is determined for a coding block.

In the QTBT partitioning method, it may be set that only symmetric partitioning is allowed in BT. However, if only symmetric binary partitioning is allowed even though an object and a background are divided at a block boundary, coding efficiency may be lowered. Accordingly, in the present invention, a method of partitioning a coding block asymmetrically is proposed in order to increase the coding efficiency.

Asymmetric binary tree partitioning represents dividing a coding block into two smaller coding blocks. As a result of the asymmetric binary tree partitioning, the coding block may be divided into two coding blocks of an asymmetric form. For convenience of explanation, in the following embodiments, dividing a coding block into two partitions of a symmetrical form will be referred to as a binary tree partition (or binary tree partitioning), and dividing a coding block into tow partitions of an asymmetric form will be referred to as an asymmetric binary tree partition (or asymmetric binary tree partitioning).

Figure 7:
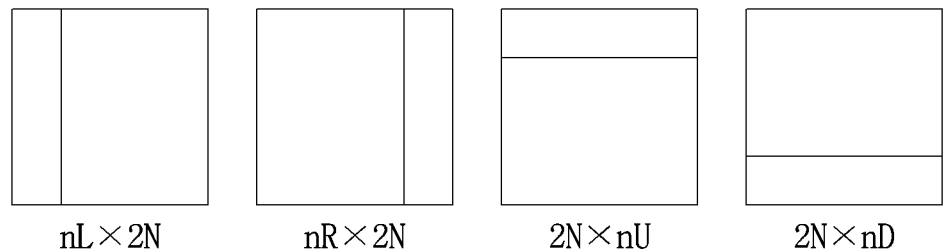
FIG. 7 illustrates a partition type of a coding block based on asymmetric binary tree partitioning.

FIG. 7 illustrates a partition type of a coding block based on asymmetric binary tree partitioning. A coding block of 2N×2N may be divided into two coding blocks whose width ratio is n:(1−n) or two coding blocks whose height ratio is n:(1−n). Where n may represent a real number greater than 0 and less than 1.

It is illustrated in FIG. 7 that two coding blocks whose width ratio is 1:3 or 3:1 or whose height ratio is 1:3 or 3:1 are generated by applying the asymmetric binary tree partitioning to a coding block.

Specifically, as a coding block of W×H size is partitioned in a vertical direction, a left partition whose width is ¼W and a right partition whose width is ¾W may be generated. As described above, a partition type in which the width of the left partition is smaller than the width of the right partition can be referred to as nL×2N binary partition.

As a coding block of W×H size is partitioned in a vertical direction, a left partition whose width is ¾W and a right partition whose width is ¼W may be generated. As described above, a partition type in which the width of the right partition is smaller than the width of the left partition can be referred to as nR×2N binary partition.

As a coding block of W×H size is partitioned in a horizontal direction, a top partition whose width is ¼H and a bottom partition whose width is ¾H may be generated. As described above, a partition type in which the height of the top partition is smaller than the height of the bottom partition can be referred to as 2N×nU binary partition.

As a coding block of W×H size is partitioned in a horizontal direction, a top partition whose width is ¾H and a bottom partition whose width is ¼H may be generated. As described above, a partition type in which the height of the bottom partition is smaller than the height of the top partition can be referred to as 2N×nD binary partition.

In FIG. 7, it is illustrated that a width ratio or a height ratio between two coding blocks is 1:3 or 3:1. However, the width ratio or the height ratio between two coding blocks generated by asymmetric binary tree partitioning is not limited thereto. The coding block may be partitioned into two coding blocks having different width ratio or different height ratio from those shown in the FIG. 7.

When the asymmetric binary tree partitioning is used, an asymmetric binary partition type of a coding block may be determined based on information signaled via a bitstream. For example, a partition type of a coding block may be determined based on information indicating a partitioning direction of the coding block and information indicating whether a first partition, generated by dividing the coding block, has a smaller size than a second partition.

The information indicating the partitioning direction of the coding block may be a flag of 1 bit indicating whether the coding block is partitioned in a vertical direction or in a horizontal direction. For example, hor_binary_flag may indicate whether the coding block is partitioned in a horizontal direction. If a value of hor_binary_flag is 1, it may indicate that the coding block is partitioned in the horizontal direction and if the value of hor_binary_flag is 0, it may indicate that the coding block is partitioned in the vertical direction. Alternatively, ver_binary_flag indicating whether or not the coding block is partitioned in the vertical direction may be used.

The information indicating whether the first partition has a smaller size than the second partition may be a flag of 1 bit. For example, is_left_above_small_part_flag may indicate whether a size of a left or top partition generated by dividing the coding block is smaller than a right or bottom partition. If a value of is_left_above_small_part_flag is 1, it means that the size of the left or top partition is smaller than the right or bottom partition. If the value of is_left_above_small_part_flag is 0, it means that the size of the left or top partition is larger than the right or bottom partition. Alternatively, is_right_bottom_small_part_flag indicating whether the size of the right or bottom partition is smaller than the left or top partition may be used.

Alternatively, sizes of a first partition and a second partition may be determined by using information indicating a width ratio, a height ratio or an area ratio between the first partition and the second partition.

When a value of hor_binary_flag is 0 and a value of is_left_above_small_part_flag is 1, it may represent nL×2N binary partition, and when a value of hor_binary_flag is 0 and a value of is_left_above_small_part_flag is 0, it may represent nR×2N binary partition. In addition, when a value of hor_binary_flag is 1 and a value of is_left_above_small_part_flag is 1, it may represent 2N×nU binary partition, and when a value of hor_binary_flag is 1 and a value of is_left_above_small_part_flag is 0, it may represent 2N×nD binary partition.

As another example, the asymmetric binary partition type of the coding block may be determined by index information indicating a partition type of the coding block. Here, the index information is information to be signaled through a bitstream, and may be encoded with a fixed length (i.e., a fixed number of bits) or may be encoded with a variable length. For example, Table 1 below shows the partition index for each asymmetric binary partition.

TABLE 1

|  | Asymmetric partition index | Binarization |
| --- | --- | --- |
| nLx2N | 0 | 0 |
| nRx2N | 1 | 10 |
| 2NxnU | 2 | 100 |
| 2NxnD | 3 | 111 |

Asymmetric binary tree partitioning may be used depending on the QTBT partitioning method. For example, if the quadtree partitioning or the binary tree partitioning is no longer applied to the coding block, it may be determined whether or not to apply asymmetric binary tree partitioning to the coding block. Here, whether or not to apply the asymmetric binary tree partitioning to the coding block may be determined by information signaled through the bitstream. For example, the information may be a 1 bit flag 'asymmetric binary tree flag', and based on the flag, it may be determined whether the asymmetric binary tree partitioning is applied to the coding block.

Alternatively, when it is determined that the coding block is partitioned into two blocks, it may be determined whether the partition type is binary tree partitioning or asymmetric binary tree partitioning. Here, whether the partition type of the coding block is the binary tree partitioning or the asymmetric binary tree partitioning may be determined by information signaled through the bitstream. For example, the information may be a 1 bit flag 'is_asymmetric_split_flag', and based on the flag, it may be determined whether the coding block is partitioned into a symmetric form or an asymmetric from.

As another example, indexes assigned to symmetric type binary partitions and to asymmetric type binary partitions may be different, and it may be determined based on index information whether the coding block is partitioned in a symmetric type or an asymmetric type. For example, Table 2 shows an example in which different indexes are assigned to symmetric binary type partitions and asymmetric binary type partitions.

TABLE 2

|  | Binary partition index | Binarization |
| --- | --- | --- |
| 2NxN (Binary partition in horizontal direction) | 0 | 0 |
| Nx2N (Binary partition in vertical direction) | 1 | 10 |
| nLx2N | 2 | 110 |
| nRx2N | 3 | 1110 |
| 2NxnU | 4 | 11110 |
| 2NxnD | 5 | 11111 |

Figure 8:
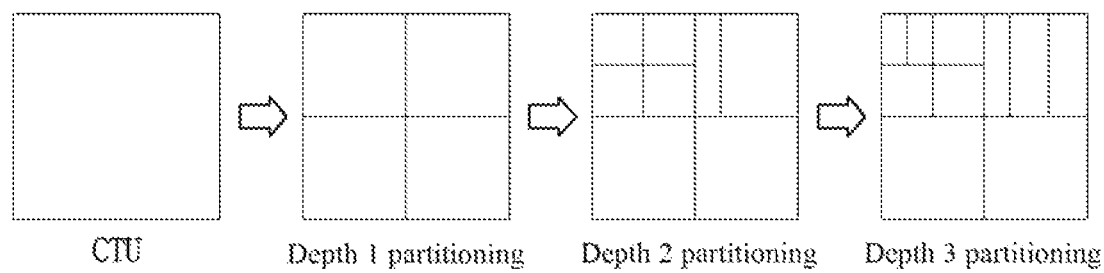
FIG. 8 shows an example in which a coding block is divided into a plurality of coding blocks using QTBT and asymmetric binary tree partitioning.
Figure 8:
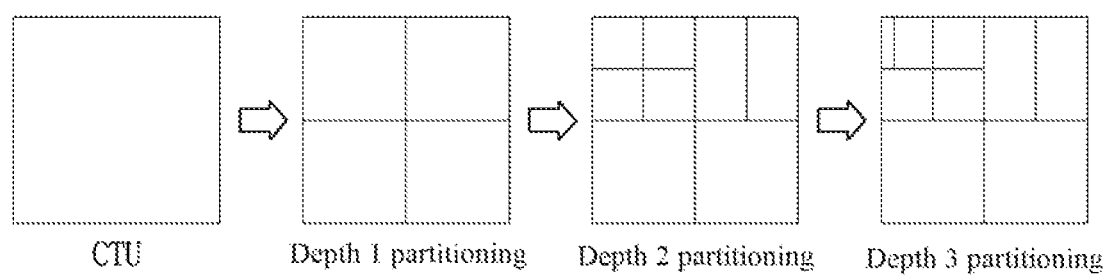
Figure 8:
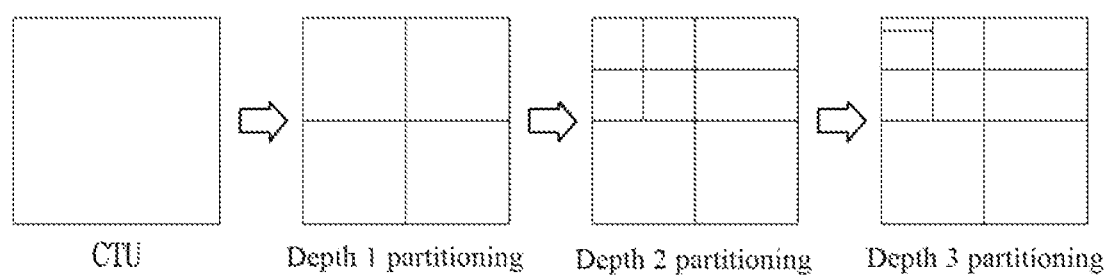

A coding tree block or a coding block may be divided into a plurality of coding blocks by quad tree partitioning, binary tree partitioning or asymmetric binary tree partitioning. For example, FIG. 8 shows an example in which a coding block is divided into a plurality of coding blocks using QTBT and asymmetric binary tree partitioning. Referring to FIG. 8, it can be seen that the asymmetric binary tree partitioning is performed in depth 2 partitioning in the first drawing, depth 3 partitioning in the second drawing, and depth 3 partitioning in the third drawing, respectively.

It may be restricted that a coding block divided by the asymmetric binary tree partitioning is no longer divided. For example, information related to a quadtree, binary tree, or asymmetric binary tree may not be encoded/decoded for a coding block which is generated by the asymmetric binary tree partitioning. That is, for a coding block generated through the asymmetric binary tree partitioning, a flag indicating whether quadtree partitioning is applied, a flag indicating whether binary tree partitioning is applied, a flag indicating whether asymmetric binary tree partitioning is applied, a flag indicating a direction of the binary tree partitioning or the asymmetric binary tree partitioning, or index information indicating an asymmetric binary partition, or the like may be omitted. As another example, whether or not to allow the binary tree partitioning may be determined depending on whether the QTBT is allowed or not. For example, in a picture or a slice in which the QTBT-based partitioning method is not used, it may be restricted not to use the asymmetric binary tree partitioning.

Information indicating whether the asymmetric binary tree partitioning is allowed may be encoded and signaled in a unit of a block, a slice or a picture. Here, the information indicating whether the asymmetric binary tree partitioning is allowed may be a flag of 1 bit. For example, if a value of is used asymmetric QTBT enabled flag is 0, it may indicate that the asymmetric binary tree partitioning is not used. It is also possible that is used asymmetric QTBT enabled Flag is set to 0 without signaling thereof when the binary tree partitioning is not used in a picture or a slice.

It is also possible to determine a partition type allowed in a coding block based on a size, a shape, a partition depth, or a partition type of the coding block. For example, at least one of partition types, partition shapes or a number of partitions allowed in a coding block generated by the quad tree partitioning and in a coding block generated by the binary tree partitioning may be different from each other.

Figure 9:
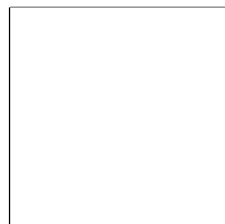
FIG. 9 is a diagram illustrating partition types which can be applied to a coding block.
Figure 9:
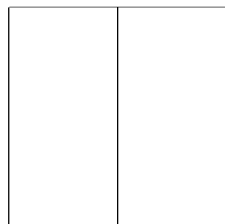
Figure 9:
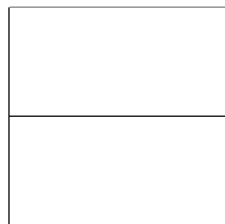
Figure 9:
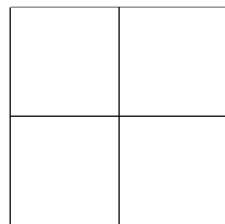
Figure 9:
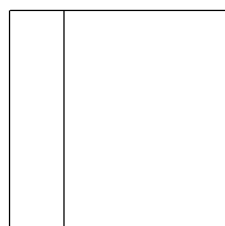
Figure 9:
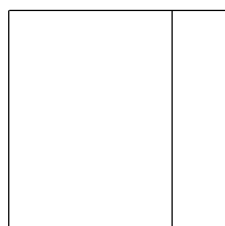
Figure 9:
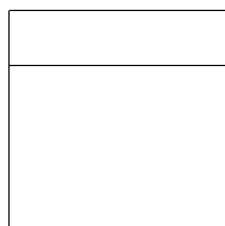
Figure 9:
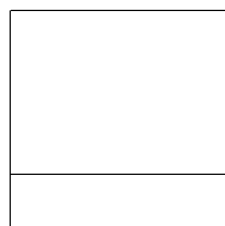

For example, if a coding block is generated by the quadtree partitioning, all of the quadtree partitioning, the binary tree partitioning, and the asymmetric binary tree partitioning may be allowed for the coding block. That is, if a coding block is generated based on quad tree partitioning, all partition types shown in FIG. 9 can be applied to the coding block. For example, a 2N×2N partition may represent a case where a coding block is not further divided, N×N may represent a case where a coding block is partitioned in a quad-tree, and N×2N and 2N×N may represent a case where a coding block is partitioned in a binary tree. In addition, nL×2N, nR×2N, 2N×nU, and 2N×nD may represent cases where a coding block is partitioned in an asymmetric binary tree. On the other hand, when a coding block is generated by the binary tree partitioning, it may not be allowed to use the asymmetric binary tree partitioning for the coding block. That is, when the coding block is generated based on the binary tree partitioning, it may be restricted not to apply the asymmetric partition type (nL×2N, nR×2N, 2N×nU, 2N×nD) among the partition types shown in FIG. 9 to the coding block.

When QTBT is used, a coding block which is not further divided can be used as a prediction block. That is, the coding block can be encoded using at least one of a skip mode, an intra prediction, an inter prediction, or a skipping method.

As another example, if a coding block is determined, a prediction block having the same size as the coding block or smaller size than the coding block may be determined through predictive partitioning of the coding block. Predictive partitioning of a coding block may be performed by a partition mode (Part mode) indicating a partition type of the coding block. A size or a shape of a prediction block may be determined according to the partition mode of the coding block. The partition type of the coding block may be determined through information specifying any one of partition candidates. At this time, the partition candidates available to the coding block may include an asymmetric partition type (for example, nL×2N, nR×2N, 2N×nU, 2N×nD) depending on a size, a shape or an encoding mode of the coding block. For example, partition candidates available to a coding block may be determined according to an encoding mode of a current block. For example, FIG. 10 is a diagram illustrating a partition mode that can be applied to a coding block when the coding block is encoded by inter prediction.

Figure 10:
FIG. 10 is a diagram illustrating a partition mode that can be applied to a coding block when the coding block is encoded by inter prediction.
Figure 10:
Figure 10:
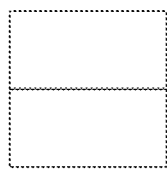
Figure 10:
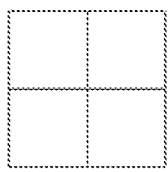
Figure 10:
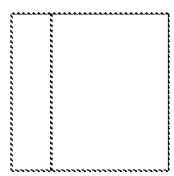
Figure 10:
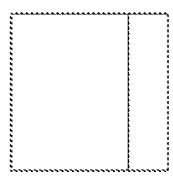
Figure 10:
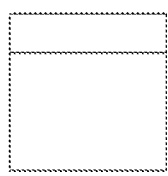
Figure 10:
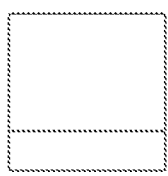

If a coding block is encoded by an inter prediction, one of 8 partition modes illustrated in FIG. 10 may be applied to the coding block.

On the other hand, when a coding block is encoded by intra prediction, a partition mode of PART_2N×2N or PART_N×N may be applied to the coding block. PART_N×N may be applied when a coding block has a minimum size. Here, the minimum size of the coding block may be pre-defined in the encoder and the decoder. Alternatively, information regarding the minimum size of the coding block may be signaled via the bitstream. For example, the minimum size of the coding block is signaled through a slice header, so that the minimum size of the coding block may be defined per slice.

In another example, partition candidates available to a coding block may be determined differently depending on at least one of a size or shape of the coding block. For example, the number or type of partition candidates available to a coding block may be differently determined according to at least one of a size or shape of the coding block.

Alternatively, a type or number of asymmetric partition candidates among partition candidates available to a coding block may be limited depending on a size or shape of the coding block. For example, the number or type of asymmetric partition candidates available to a coding block may be differently determined according to at least one of a size or shape of the coding block.

In general, a prediction block may have a size from 64×64 to 4×4. However, when a coding block is encoded by inter prediction, it is possible to prevent the prediction block to have 4×4 size in order to reduce the memory bandwidth when performing motion compensation.

As another example, at least one of a prediction block or a transform block may be generated by merging a plurality of coding blocks. The prediction block or the transform block generated by merging a plurality of coding blocks can be referred to as a merge prediction block or a merge transform block. Accordingly, the prediction block or the transform block may be larger than a size of the coding block. Hereinafter, an example of generating the merge prediction block and the merge transform block will be described in detail.

Figure 11:
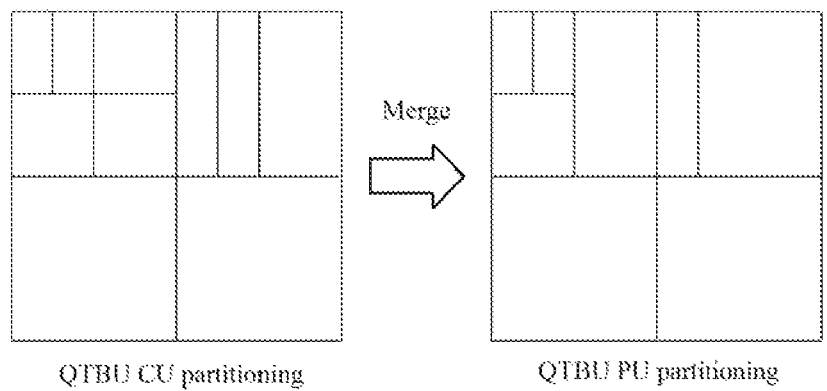
FIG. 11 is a diagram illustrating an example in which a merge prediction block is generated.
Figure 11:
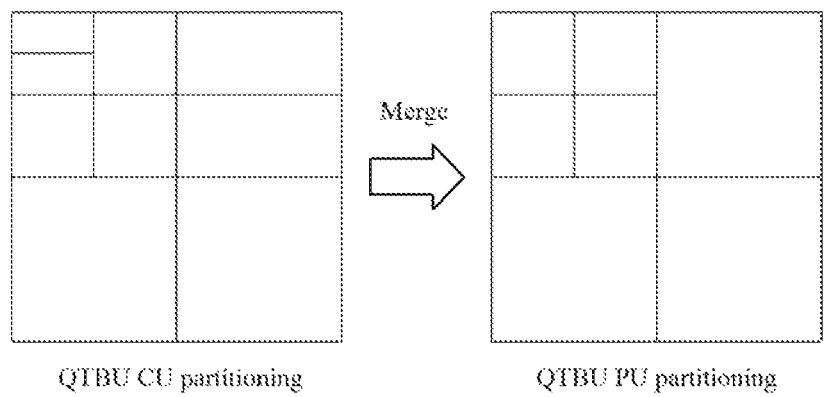

FIG. 11 is a diagram illustrating an example in which a merge prediction block is generated. If a coding block is divided into a plurality of coding blocks based on QTBT partitioning or an asymmetric binary tree partitioning, at least one of final divided coding blocks may be merged with another to generate a merge prediction block. For example, it is illustrated in an above drawing in FIG. 11 that a merge prediction block is generated by merging two blocks whose sizes are different from each other, and it is illustrated in a below drawing in FIG. 11 that a merge prediction block is generated by merging two blocks whose sizes are the same.

Intra prediction or inter prediction for the current block may be performed in a unit of a merge prediction block or a coding block.

Even when intra prediction or inter prediction is performed in a unit of a coding block, single motion information may be defined for each merge prediction block, or single intra prediction mode may be may be defined for each merge prediction block. That is, a plurality of coding blocks included in the merge prediction block may share the motion information or the intra prediction mode. Here, the motion information may include at least one of a merge candidate (or a merge candidate list), an AMVP candidate (or an AMVP candidate list), a candidate index, a motion vector, a reference picture index, or a list utilization flag.

Alternatively, a merge transform block may be divided into a plurality of sub-blocks. And it is also possible to use different motion information or different intra prediction modes for each sub-block. In this case, the number of sub-blocks may be different from the number of coding blocks included in the merge prediction block.

A coding block that can be merged with a coding block that is current encoding/decoding target (hereinafter referred to as a current coding block) can be referred to as a merge target candidate block. The merge target candidate block may include a coding block neighboring the current coding block. For example, a coding block neighboring a left side or a top side of the current coding block may be included in the merge target candidate block of the current coding block. Alternatively, a coding block neighboring a right side or a bottom side of the current coding block, or a coding block adjacent to one corner of the current coding block may also be used as the merge target candidate block of the current coding block.

The merge target candidate block of the current coding block may be limited by at least one of a width, a height, or a size of the current coding block.

For example, a neighboring coding block having a width or a height equal to a width or a height of the current coding block may be used as a merge target candidate block of the current coding block. A coding block neighboring a top of the current coding block can be used as the merge target candidate block of the current coding block only when it has a same width as the current coding block, and a coding block neighboring a left of the current coding block can be used as the merge target candidate block of the current coding block only when it has a same height as the current coding block.

For example, a neighboring block having the same size as the current coding block (i.e., a coding block having the same width and the same height as the current coding block) among neighboring coding blocks adjacent to the current coding block can be used as a merge target candidate block of the current coding block. On the other hand, if a size of a neighboring coding block is different from the current block, the coding block cannot be used as a merge target candidate block of the current coding block.

That is, all of a left coding block and a top coding block may be used as a merge target candidate block of the current block or only one of the left coding block and the top coding block may be used as a merge target candidate block of the current block depending on whether they have the same width, the same height, or the same size as the current coding block. Or, it is also possible that all of neighboring coding blocks adjacent to the current coding block may be unavailable as a merge target candidate block.

A merge target candidate block of the current coding block may be limited by a shape of the current coding block. For example, if the current coding block is a non-square block having a width greater than a height, such as 2N×N, a coding block adjacent to a top of the current coding block may be set as a merge target candidate block of the current coding block. On the other hand, if the current coding block is a non-square block having a height greater than a width, such as N×2N, a coding block adjacent to a left of the current coding block may be set as a merge target candidate block of the current coding block.

Generating a merge prediction block by merging the current coding block with a neighboring coding block can be referred to as a prediction block merging method. At this time, whether or not the prediction block merging method is allowed for the current coding block may be determined based on at least one of a size, a shape, a partition depth, a position, an encoding mode, or an intra prediction mode of the current coding block. For example, the prediction block merging method may be allowed only when a size of the current coding block is less than or equal to a predetermined size.

In addition, whether to merge the current coding block with a merge target candidate block may be determined based on information signaled from the bitstream. The information may be a flag of 1 bit, and it may be determined based on the information whether to merge the current coding block with the merge target candidate block.

If there are a plurality of merge target candidate blocks of the current coding block, index information specifying one of the plurality of merge target candidate blocks may be encoded/decoded. A merge prediction block may be generated by merging the current coding block with a merge target candidate block specified by the index information.

A merge transform block may be generated by merging a plurality of coding blocks. That is, the merge transform block may include a plurality of coding blocks. The merge transform block may be used as a base unit for a transform or a quantization of residual signals (or transform coefficients). Accordingly, the same transform scheme can be applied to transform coefficients included in the merge transform block.

Alternatively, the merge transform block may be divided into a plurality of sub-blocks. And, it is also possible to perform a quantization or a transform on each sub-block. Accordingly, a different transform scheme may be applied to each sub-block. In this case, the number of sub-blocks may be different from the number of coding blocks included in the merge transform block.

The merge transform block may be set the same as the merge prediction block, or may be set to have a different size or different shape from the merge prediction block.

For example, the merge transform block may be generated following the merge predict block. That is, the merge transform block may have the same size and shape as the merge prediction block.

In another example, the merge transform block may be generated independently of the merge predicting block. That is, the merge transform block may be generated based on information indicating whether to merge the current coding block with a neighboring coding block, index information indicating a neighboring coding block which will be merged with the current coding block, or the like.

It is also possible to signal information indicating whether to set the merge transform block equal to the merge prediction block through the bit stream.

A merge prediction block or a merge transform block generated by merging coding blocks may be limited to a predetermined size or a predetermined shape. That is, it may be determined whether to merge two coding blocks based on whether the merge prediction block or the merge transform block, which is generated by merging two coding blocks, has the predetermined size or the predetermined shape. For example, the merge prediction block or the merge transform block may be limited to a rectangle shape or a square shape.

In another example, it is also possible that the merge prediction block or the merge transform block has a non-rectangular shape. For example, if the current coding block is merged with a coding block neighboring a left side of the current coding block and a coding block neighboring a top side of the current coding block, the merge prediction block or the merge transform block of non-rectangular shape may be generated.

Figure 12:
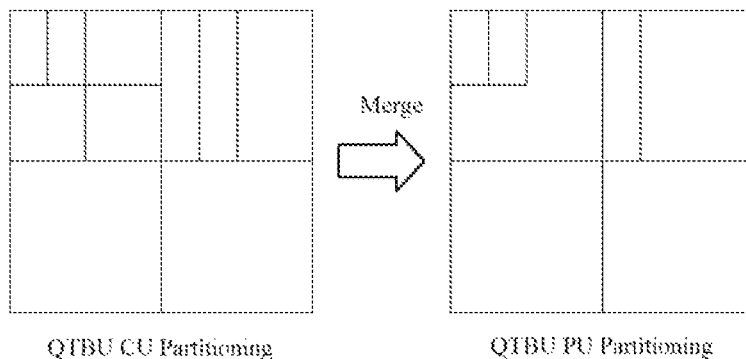
FIG. 12 is a diagram illustrating an example in which a merge prediction block is generated by merging a plurality of coding blocks.
Figure 12:
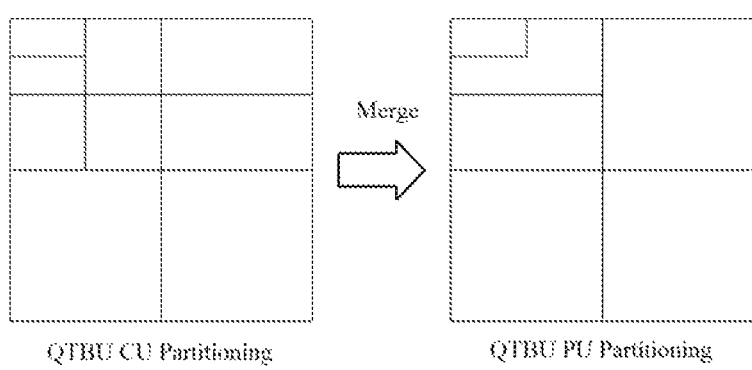

FIG. 12 is a diagram illustrating an example in which a merge prediction block is generated by merging a plurality of coding blocks. In the example shown in FIG. 12, a coding block is merged with two coding blocks neighboring to left and top sides of the coding block, so that the merge prediction block that is not a rectangular shape is generated.

If the merge prediction block is not a rectangular shape, the merge prediction block may be divided into square-shaped sub-blocks, and prediction may be performed in a unit of a sub-block. At this time, all sub-blocks in the merge prediction block may use the same motion information or may use the same intra prediction mode.

When performing intra prediction on the merge prediction block of a non-rectangular shape, reference samples for the merge prediction block may be derived from neighboring samples adjacent to the merge prediction block. At this time, the neighboring samples may include a sample bordering a boundary of the merge prediction block. Accordingly, top reference samples or left reference samples of the merge prediction block may be not arranged in a line according to a shape of the merge prediction block.

Figure 13:
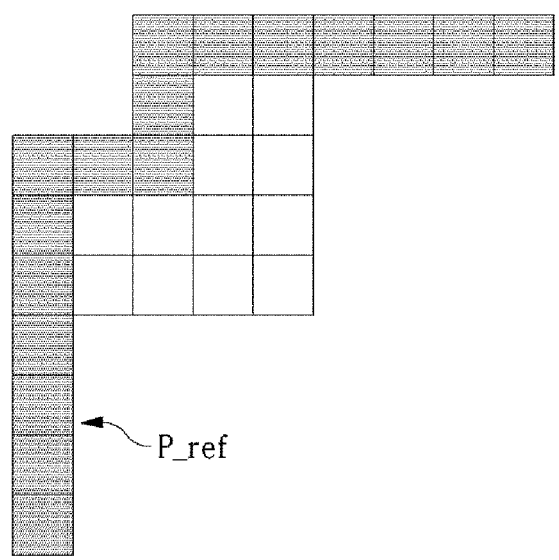
FIGS. 13 and 14 are diagrams illustrating reference samples of a merge prediction block.

For example, FIG. 13 is a diagram illustrating reference samples of a merge prediction block. In FIG. 13, reference samples of the merge prediction block are shown distributed along a top boundary and a left boundary of the merge prediction block.

In another example, reference samples of the merge prediction block may be derived from neighboring samples included in a row or column adjacent to the top most boundary of the merge prediction block and the left most boundary of the merge prediction block. Accordingly, top reference samples or left reference samples of the merge prediction block may be arranged in a line regardless of a shape of the merge prediction block.

Figure 14:
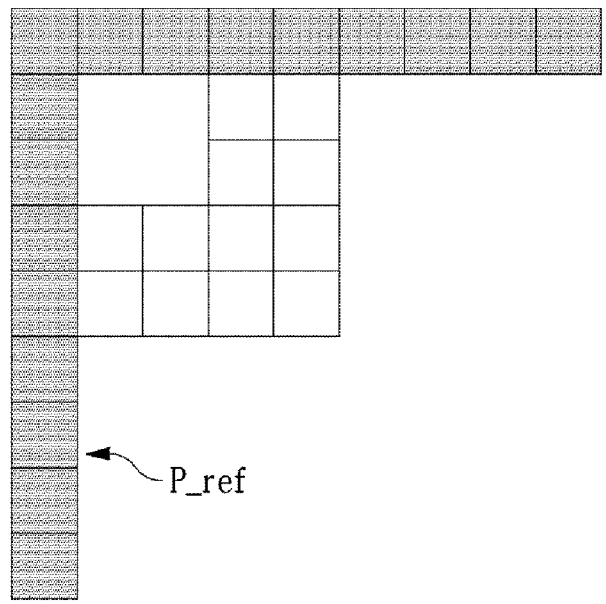

For example, FIG. 14 is a diagram illustrating a reference sample of a merge prediction block. In FIG. 14, reference samples of the merge prediction block are shown distributed along the top most boundary and the left most boundary of the merge prediction block.

If a merge transform block is not a rectangular shape, the merge transform block may be divided into sub-blocks of a rectangular shape, and a quantization and/or a transform may be performed in a unit of a sub-block. At this time, all sub-blocks in the merge prediction block may use the same transform scheme.

Information indicating whether the prediction block merging method or the transform block merging method is allowed within a predetermined unit may be signaled through the bitstream. For example, information indicating whether the prediction block merging method or the transform block merging method is allowed in a picture, a slice or a block (e.g., CTU) may be signaled.

The above described block merging methods (i.e., the prediction block merging method or the transform block merging method) may not be used in combination with the asymmetric binary tree partitioning method. That is, asymmetric blocks may be generated by selectively using either the asymmetric binary tree partitioning method or the block merging method after dividing the coding block based on the QTBT.

In the above examples, it is described that the merge prediction block or the merge transform block having a size greater than a coding block by merging coding blocks, however, it is also possible to set a size of the merge prediction block or the merge transform block same as the coding block. That is, a plurality of coding blocks may be merged to generate a merge coding block, and the generated merge coding block may be used as the merge prediction block or the merge transform block.

Figure 15:
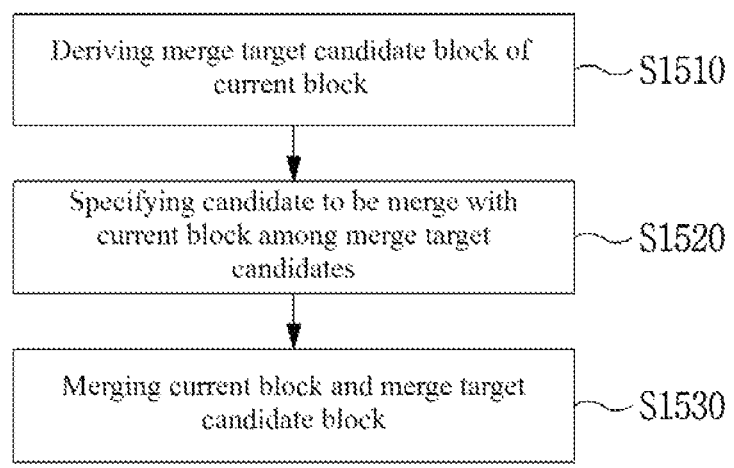
FIG. 15 is a flowchart illustrating a block merging method according to an embodiment of the present invention.

FIG. 15 is a flowchart illustrating a block merging method according to an embodiment of the present invention.

First, a merge target candidate block for a current coding block to be decoded/encoded may be determined S1510. The merge target candidate block for the current coding block may be derived from neighboring blocks adjacent to the current coding block. At this time, whether a neighboring block adjacent to the current coding block is available as the merge target candidate block may be determined based on at least one of a height, a width or a size of the current coding block.

If merge target candidate blocks for the current coding block is determined, a merged target candidate block to be merged with the current coding block may be specified S1520. Specifically, the merge target candidate block to be merged with the current coding block may be determined based on index information specifying at least one of merge target candidate blocks of the current block.

If the merge target candidate block for the current coding block is determined, a merged block may be generated by merging the current coding block and the determined merge target candidate block S1530. The merged block may be used as a prediction block, which is a basic unit of prediction, or as a transform block, which is a basic unit of encoding/decoding residual signal.

The encoder may perform a transform or a quantization on a residual sample (or residual signal) in a unit of a predetermined block, and thereby generate a residual coefficient. Here, the unit of the predetermined block, which is a unit for performing the transform or the quantization, may have the same size for each color component or may have different sizes for each color component. For example, a residual coefficient may be generated for each of a luminance component (Luma) and each chrominance component (Cb, Cr) in different block units.

The block unit in which the transform or the quantization is performed can be referred to as a transform block, and the transform block may have a square shape or a non-square shape. For example, the transform block may have a square shape such as 4×4, 8×, 16×16, 32×32, or 64×64, or may have a non-square shape, such as 4×8, 8×4, 8×16, 16×8, 16×32, 32×16, 32×64, 64×32, 4×16, 4×32, or 8×32.

The decoder may decode a residual coefficient from the bitstream received from the encoder and may perform at least one of an inverse quantization or an inverse transform on the decoded residual signal to decode a residual sample (or residual signal). The processes of generating the residual signal by decoding the residual coefficient and by generating the residual signal by performing at least one of the inverse quantization and the inverse transform on the decoded residual signal may be defined as 'residual coefficient decoding'.

Hereinafter, the residual coefficient decoding processes will be described in detail.

Figure 16:
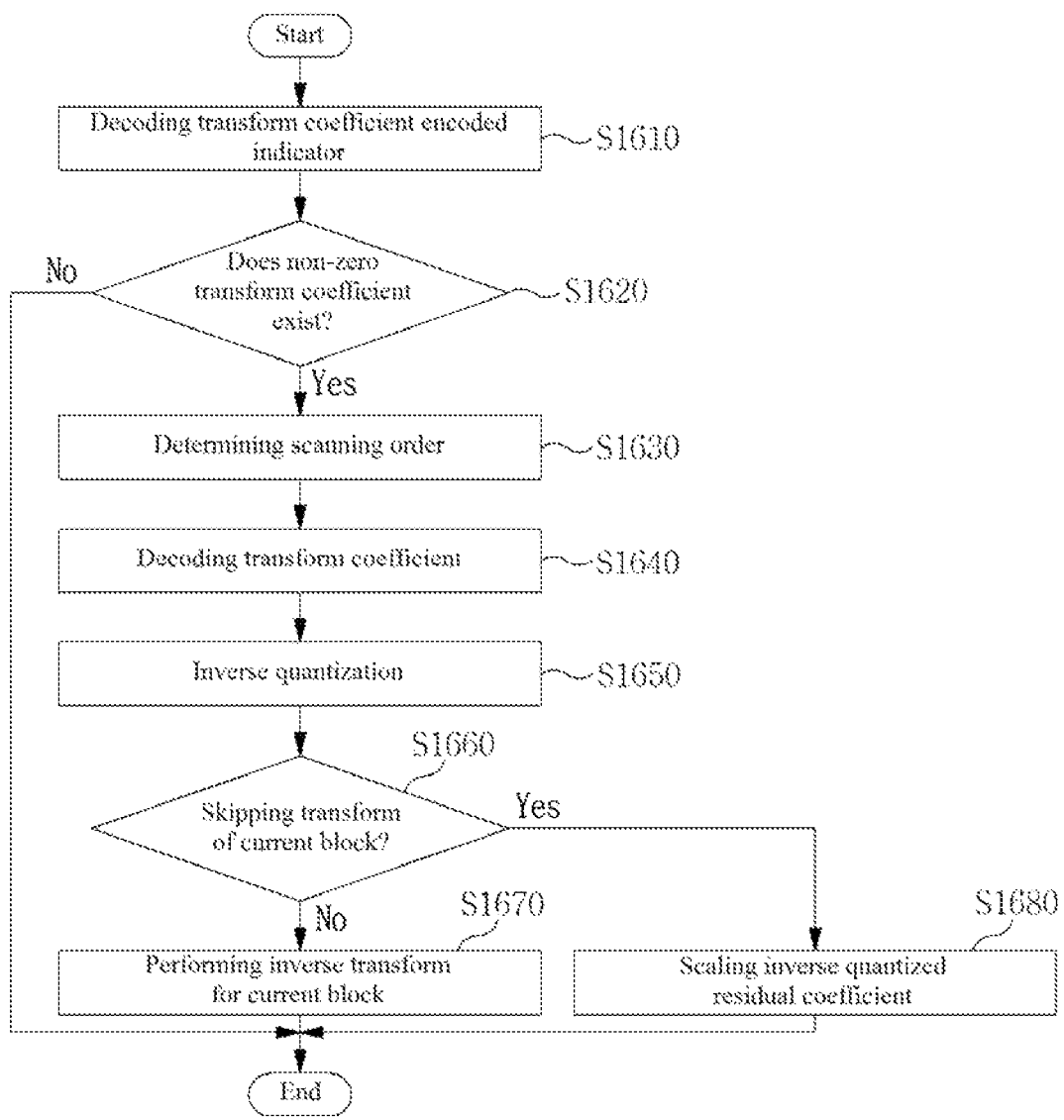
FIG. 16 is a flowchart illustrating processes of obtaining a residual sample according to an embodiment to which the present invention is applied.

FIG. 16 is a flowchart illustrating processes of obtaining a residual sample according to an embodiment to which the present invention is applied.

The decoder may decode information indicating whether a non-zero transform coefficient exists in a current block from the bitstream S1610, and may determine whether to decode a residual coefficient of the current block based on the information S1620.

The information may include a transform coefficient coded indicator (coded_block_flag, CBF) indicating whether or not a transform coefficient exists in the current block. The transform coefficient coded indicator may indicate whether a non-zero transform coefficient exists in a block of a predetermined unit. For example, if the transform coefficient coded indicator is 0, it indicates that there is no non-zero transform coefficient in the block of the predetermined unit, and if the transform coefficient coded indicator is 1, it indicates that at least one non-zero transform coefficient exists in the block of the predetermined unit. The transform coefficient coded indicator may be encoded and signaled for each of a luminance component and a chrominance component.

The transform coefficient coded indicator may include at least one of an indicator (i.e., 'rqt_root_cbf') signaled in a unit of a block (e.g., a transform block, a coding block or a coding tree block) or an indicator (e.g., 'coded_sub_block_flag') signaled in a unit of a sub-block of a pre-determined size.

For example, rqt_root_cbf may indicate whether or not a non-zero transform coefficient is included in the current block. The decoder may determine whether to decode the residual coefficient according to a value of the rqt_root_cbf. For example, if rqt_root_cbf is 0, decoding of a transform coefficient for the current block (e.g., the current transform block) is not performed, and values of all residual samples in the current block may be set to zero. On the other hand, if rqt_root_cbf is 1, decoding of a transform coefficient for the current block may be performed.

The coded_sub_block_flag may indicate whether or not a non-zero coefficient is included in a sub-block of a predetermined size. For example, the coded_sub_block_flag may be encoded and signaled in a unit of of a sub-block of 4×4 size. If the coded_sub_block_flag is 0, it may mean that there is no non-zero transform coefficient in a sub-block of a predetermined size, and if the coded_sub_block_flag is 1, it may mean that at least one non-zero transform coefficient exists in a sub-block of a predetermined size.

The rqt_root_cbf and the coded_sub_block_flag may be hierarchically encoded and signaled. For example, when the rqt_root_cbf is 0, encoding of the coded_sub_block_flag may be omitted. On the other hand, when the rqt_root_cbf is 1 and the current block size is larger than a sub-block, the coded_sub_block_flag may be encoded and signaled in a unit of a sub-block of a predetermined size in the current block.

The transform coefficient coded indicator may be hierarchically encoded and signaled between a transform block and a coding block. A first transform coefficient coded indicator indicating whether or not at least one transform block including a non-zero transform coefficient among a plurality of transform blocks is included may be encoded/decoded. And then, according to a value of the first transform coefficient coded indicator, it may be determined whether to encode/decode a second transform coefficient coded indicator for each sub-block. Here, at least one of a size or a shape of an upper node block including the plurality of transform blocks may be a pre-determined value or may be determined based on information decoded from the bitstream. Alternatively, at least one of a size or a shape of the upper node block may be determined based on a partition type of a coding tree block. For example, a non-square coding block or a square coding block including the plurality of transform blocks may be defined as the upper node block for the plurality of non-square transform blocks. Transform coefficient coded indicators may be hierarchically encoded through two or more layers.

As described above, a method of hierarchically encoding transform coefficient coded indicators will be referred to as a hierarchical transform coefficient coded indicator (Hierarchical Coded Block Flag, HCBF) deriving method.

When at least one non-zero transform coefficient is included in the current block, a transform coefficient may be decoded using a transform coefficient level indicator indicating whether the transform coefficient is 0 or not. The transform coefficient level indicator is a 1 bit flag (e.g., 'significant flag') and indicates whether each transform coefficient in the current block is 0 or not. For example, if the significant flag is 1, it indicates that the transform coefficient is not 0, and if the significant flag is 0, it indicates that the transform coefficient is 0.

It will be referred to as a transform coefficient level map (Significant Map) which shows whether each of transform coefficients is 0 or not. The encoder may encode the transform coefficient coded indicator and the transform coefficient level indicator for each transform coefficient according to the transform coefficient level map, and may encode an absolute value and a sign of a non-zero transform coefficient. The decoder may decode the transform coefficient level map according to the transform coefficient coded indicator and the transform coefficient level indicator, and may decode the absolute value and the sign of the non-zero transform coefficient.

Figure 17:
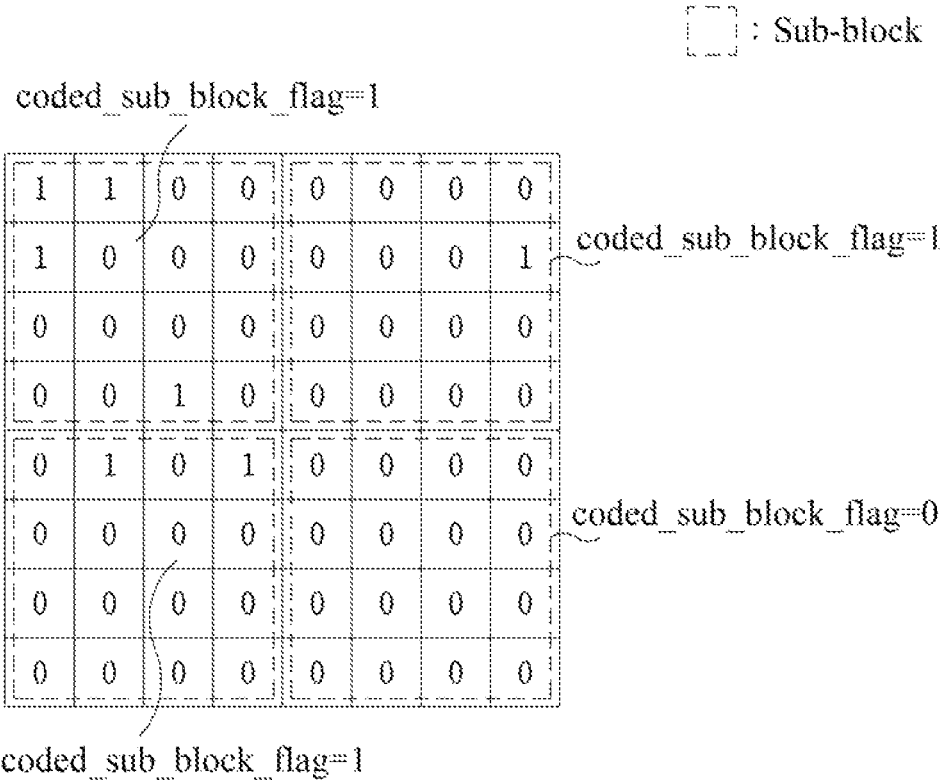
FIG. 17 is a diagram illustrating a transform coefficient level map.
Figure 17:
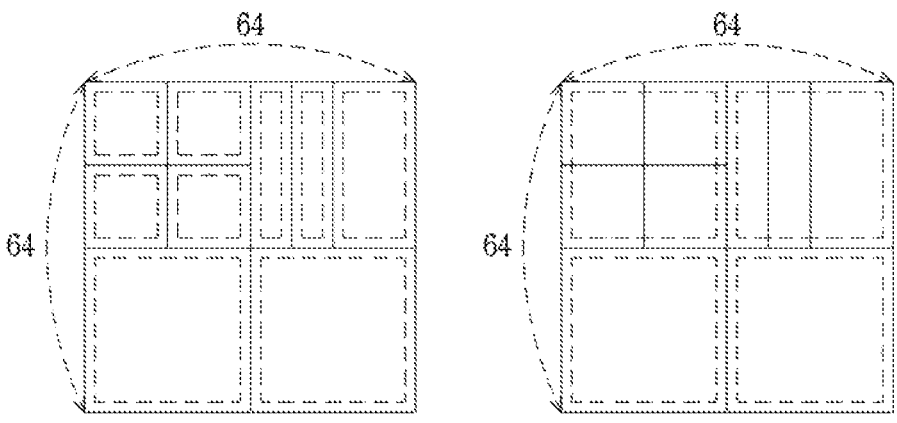

FIG. 17 is a diagram illustrating a transform coefficient level map. Values shown in FIG. 17 indicate values of transform coefficient level indicators. And, coded_sub_block_flag indicates whether or not a non-zero transform coefficient exists for a sub-block of 4×4.

A sub-block of a predetermined size for which information indicating whether a non-zero transform coefficient exists or not is encoded/decoded may be referred to as a transform coefficient basic block. For example, in FIG. 17, a block of 4×4 size in which the coded_sub_block_flag is encoded may be defined as the transform coefficient basic block.

At this time, at least one of a shape or a size of the transform coefficient basic block may be determined differently according to at least one of a shape or a size of the coding block or the transform block. For example, if the current block has a square-shape, the transform coefficient basic block of the current block may have a square-shape, and if the current block has a non-square shape, the transform coefficient basic block of the current block may also have a non-square shape. For example, when the current block has a non-square shape such as N×2N or N×4N, the transform coefficient basic block of the current block may be 2×8, and if the current block has a non-square shape such as 2N×N or 4N×N, the transform coefficient basic block of the current block may be 8×2.

As a result of the quadtree partitioning and the binary tree partitioning, a coding tree block or a coding block may include a transform block of 2×8, 8×2, 4×16, or 16×4. As described above, when the binary tree partitioning is used in addition to the quadtree partitioning, a larger number of transform blocks or more various shapes of transform blocks can be included in in a coding tree block than in the case of using only the quad tree partitioning. As the number of transform blocks increases or as the shapes of the transform blocks are diversified, encoding a transform coefficient coded indicator for every transform block may reduce coding efficiency.

Thus, in an embodiment of the present invention, instead of encoding the transform coefficient coded indicator in a unit of a transform block, it is possible to encode/decode the transform coefficient coded indicator in a unit of a predetermined unit or it is possible to determine whether to encode/decode the transform coefficient coded indicator for a current block by comparing a size of the current block with the predetermined unit. Here, the predetermined unit may be defined by a size of a block, a shape of a block, or the number of samples.

The encoder may encode and signal information for determining a predetermined unit (for example, a transform coefficient encoding unit indicator). The information may indicate a size, a shape, or the number of samples of a block. Also, the information may be encoded and signaled in at least one of a video sequence level, a picture parameter set, a slice header, or a block level.

If the predetermined unit is related to a size or the number of samples of a block, and if the current block is smaller than the predetermined unit, information on whether or not the current block includes a non-zero transform coefficient may be encoded and signaled in a unit of the predetermined unit. On the other hand, if the current block is equal to or larger than the predetermined unit, the transform coefficient coded indicator may be encoded and signaled for the current block.

Figure 18:
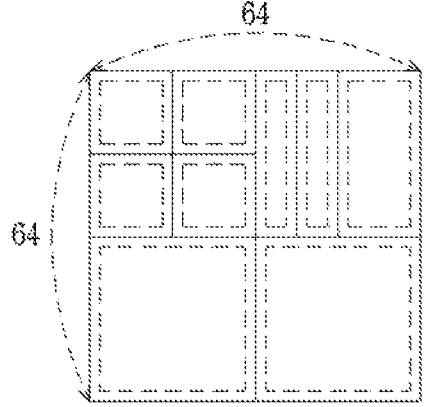
FIG. 18 is a diagram for explaining an aspect in which a transform coefficient coded indicator is decoded based on a predetermined unit.
Figure 18:
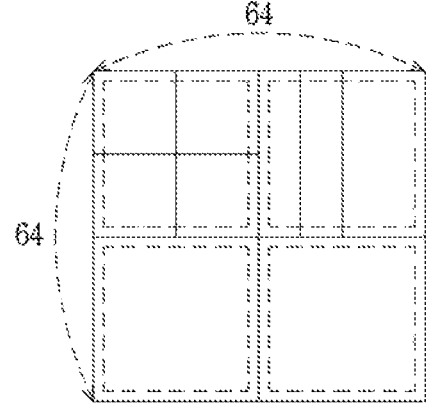

FIG. 18 is a diagram for explaining an aspect in which a transform coefficient coded indicator is decoded based on a predetermined unit.

When a predetermined unit represents 256 samples, the transform coefficient coded indicator may be encoded and signaled based on a block including 256 or more samples. Accordingly, in the example shown in FIG. 18, a transform coefficient coded indicator indicating whether or not a non-zero transform coefficient exists may be decoded for a block of 16×16 or a block of 8×32.

The transform coefficient coded indicator also can be encoded and signaled for a block including more than 256 samples. Accordingly, in the example shown in FIG. 18, the transform coefficient coded indicator indicating whether or not a non-zero transform coefficient exists may be decoded for a block of 16×32 size or a block of 32×32 size.

When a predetermined unit indicates 1024 samples, the transform coefficient coded indicator may be encoded and signaled based on a block including 1024 or more samples. Accordingly, in the example shown in FIG. 17, single transform coefficient coded indicator may decoded for an upper node block including four square blocks of 16×16 size, and single transform coefficient coded indicator may decoded for an upper node block including two non-square blocks of 8×32 size and a non-square block of 16×32 size.

The transform coefficient coded indicator may be individually encoded and signaled for blocks including more than 1024 samples. Accordingly, in the example shown in FIG. 18, the transform coefficient coded indicator may be decoded for a 32×32 block.

A predetermined unit may indicate a maximum unit in which a transform coefficient coded indicator is encoded and signaled. That is, a maximum size of a block or a shape of a block to which a transform coefficient coded indicator is encoded may be defined based on the predetermined unit. In this case, a unit in which the transform coefficient is signaled may be determined adaptively by comparing the number of samples indicated by the transform coefficient encoding unit indicator and the number of samples included in the transform block.

For example, when the number of samples indicated by the transform coefficient encoding unit indicator is larger than the number of samples included in a transform block, the transform coefficient coded indicator may be encoded and signaled for the transform block. On the other hand, when the number of samples indicated by the transform coefficient encoding unit indicator is smaller than the number of samples included in a transform block, the transform block is divided into a plurality of regions according to the predetermined unit, and the transform coefficient coded indicator is encoded for each region.

If a residual coefficient other than 0 is included in the current block, a scanning order for the current block may be determined S1630. Then, in accordance with the determined scanning order, an absolute value or a sign of each transform coefficient may be decoded S1640.

Figure 19:
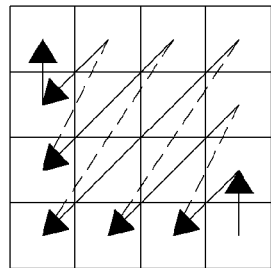
FIG. 19 is a diagram illustrating a decoding order of transform coefficients according to each scanning order.
Figure 19:
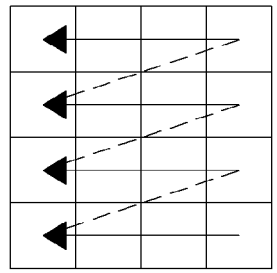
Figure 19:
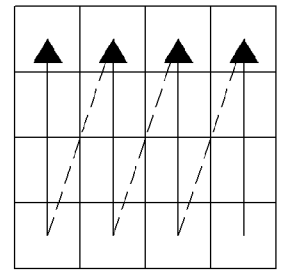

The decoder may select a scanning order of the current block among a plurality of scanning order candidates. Here, the plurality of scanning order candidates may include at least one of a diagonal scan, a horizontal scan, and a vertical scan. For example, FIG. 19 is a diagram illustrating a decoding order of transform coefficients according to each scanning order.

A scanning order of the current block may be determined based on at least one of a size, a shape, an encoding mode, or an intra prediction mode of the current block (for example, a transform block or a coding block). Here, a size of the current block may be represented by at least one of a width, a height, or an area of a block.

For example, a scanning order of the current block may be determined by comparing a size of the current block with a predetermined threshold value. Here, the predetermined threshold value may be expressed by a maximum value or a minimum value.

For example, a transform block or a coding block of 4×4 or 8×8 size encoded in intra mode may use a vertical scan, a horizontal direction, or a diagonal scan according to an intra prediction mode. Specifically, when the intra prediction mode has a horizontal direction, the vertical scan may be used. When the intra prediction mode has a vertical direction, the horizontal scan may be used. For other intra prediction modes, the diagonal scan may be used. On the other hand, the diagonal scan may be used for a transform block or a coding block encoded in inter mode or a transform block or a coding block having a size of 16×16 or more encoded in intra mode.

Alternatively, based on at least one of a size, a shape, an encoding mode, or an intra prediction mode of the current block, at least one of the number or types of scanning order candidates available for the current block may be set differently. That is, according to the above-mentioned conditions, it is possible to restrict the current block from using at least one of a diagonal scan, a horizontal scan, or a vertical scan.

For example, if the current block has a non-square shape, a scanning order available for the current block may be determined according to a width and height ratio. For example, if the current block is a coding block or a transform block having a shape whose height is longer than the width (e.g., N×2N or N×4N), at least one of a diagonal scan or a horizontal scan can be selected. On the other hand, if the current block is a coding block or a transform block having a shape whose width is longer than the height (e.g., 2N×N or 4N×N), at least one of a diagonal scan or a vertical scan can be selected.

The current block may be divided into predetermined sub-blocks, and scanning of transform coefficients may be performed in a unit of a sub-block. For example, scanning of transform coefficients may be performed on a transform coefficient basic block unit including a predetermined number of pixels.

Even when the current block has a non-square shape, the current block may be divided into sub-blocks, and scanning can be performed in a unit of a sub-block. At this time, a size of the sub-block may have a fixed value or may have a value varied based on at least one of a size or a shape of the current block (e.g., a coding block or a transform block).

For example, as described above with reference to the transform coefficient basic block, the sub-block may include a fixed number of pixels (for example, 16). Here, a size of the sub-block may be set 4×4, 2×8, or 8×2, or the like depending on a shape of a coding block or a transform block.

A partition type of the sub-block may be the same as the coding block or the transform block. Alternatively, the partition type of the sub-block may be determined independently of a partition type of the coding block. The sub-block may has a square shape or a non-square shape, depending on the partition type.

A scanning order of each sub-block may be determined according to a scanning order of the current block. For example, FIG. 20 is a diagram illustrating a scanning order between sub-blocks according to a scanning order of a current block.

Figure 20:
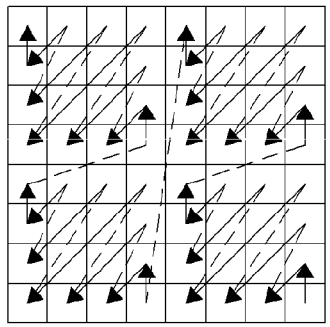
FIG. 20 is a diagram illustrating a scanning order between sub-blocks according to a scanning order of a current block.
Figure 20:
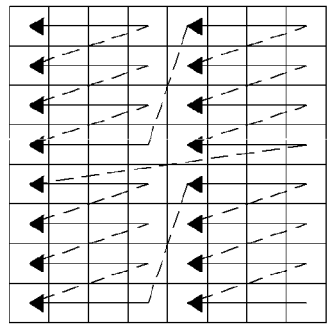
Figure 20:
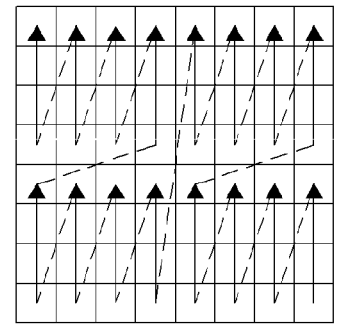

In the example shown in FIG. 20, when the scanning order of the current block is a diagonal scan, at least one of a scanning order between sub-blocks or a scanning order in a sub-block may follow the diagonal scan. On the other hand, when the scanning order of the current block is a horizontal scan, at least one of a scanning order between sub-blocks or a scanning order of transform coefficients in a sub-block may follow the horizontal scan. Alternatively, if the scanning order of the current block is a vertical scan, at least one of a scanning order between sub-blocks or a scanning order in a sub-block may follows a vertical scan.

Alternatively, a scanning order of each sub-block may be adaptively set according to a shape or a size of a coding block or a current block. That is, the scanning order of the transform coefficient basic blocks may be set differently according to the size or the shape of the current block.

Figure 21:
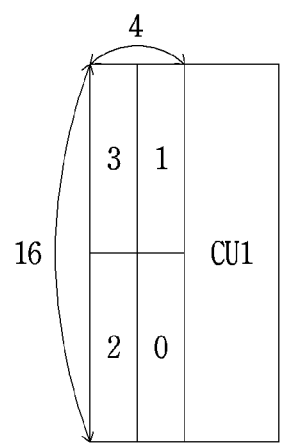
FIG. 21 is a diagram illustrating a scanning order of a transform coefficient basic block according to a shape of a current block.
Figure 21:
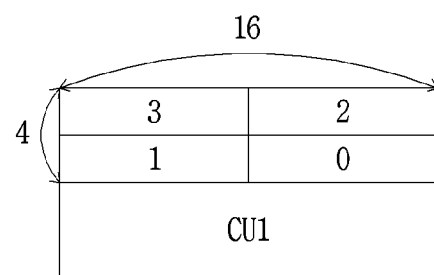

FIG. 21 is a diagram illustrating a scanning order of a transform coefficient basic block according to a shape of a current block. In FIG. 21, the numbers marked on each sub-block indicate a scanning order.

If a current block is a coding block or a transform block having a shape in which a height is longer than a width, it is possible to sequentially scan the transform coefficient basic blocks using the diagonal scan as in the example shown in FIG. 21.

On the other hand, if a current block is a coding block or a transform block having a shape in which a width is longer than a height, it is possible to sequentially scan the transform coefficient basic blocks using the horizontal scan as in the example shown in FIG. 21.

That is, according to a shape of the current block, scanning orders of the transform coefficient basic blocks may be set to be different.

A relationship between a shape of the current block and a scanning order of the transform coefficient basic blocks, which is defined in FIG. 21, is merely an example of the present invention, and the present invention is not limited thereto. For example, if a current block is a coding block or a transform block having a shape in which a height is longer than a width, it is also possible to sequentially scan transform coefficient basic blocks using the vertical scan, unlike the example shown in FIG. 21.

According to an embodiment of the present invention, scanning may be performed in a unit of a block group (or in a unit of a block) or a scanning order may be determined in a unit of the block group. Here, the block group may represent a block unit in which scanning is performed, or may represent a group of transform blocks that share the same scanning type. The block group may include at least one transform block. Alternatively, a plurality of non-square transform blocks constituting a square shaped block may be defined as the block group.

For example, if a size or a range of the block group is determined, the block group may be divided into units for scanning, and then the scanning for the block group may be performed. Here, scanning units may have the same sizes or the same shapes as transform blocks included in the block group. Alternatively, at least one of sizes or shapes of the scanning units may be different from the transform blocks included in the block group. For example, a scanning unit is limited to a square shape, while the block group includes a transform block of a non-square shape.

For example, if a size or a range of the block group is determined, a scanning order for the block group may be determined, and the determined scanning order may be applied to all transform blocks in the block group.

The block group may have a square shape or a non-square shape. In addition, the block group may include at least one non-square shaped transform block or at least one square shaped transform block.

A size of the block group may have a fixed value or may have a value determined variably. For example, a size of the block group may has a fixed value such as 64×64, 32×32, or 16×16, or may be determined based on information on the size of the block group transmitted through the bitstream.

If the residual coefficient of the current block is obtained, an inverse quantization may be performed on the residual coefficient of the current block S1650.

It is possible to determine whether to skip an inverse transform on the dequantized residual coefficient of the current block S1660. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block S1670. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value S1680.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_ flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_ transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Encoding/decoding of residual signal may be performed in a unit of a block having a specific shape. Here, the specific shape may mean a square shaped block, or a non-square shaped block whose a ratio between a width and a height is equal to or greater than a predetermined value. For convenience of explanation, it is assumed in the embodiment described below that encoding/decoding of the residual signal is performed in a unit of a block having a square shape.

If the current block (for example, a coding block or a transform block) which is a target for encoding/decoding residual signal has a non-square shape, the current block of the non-square shape is divided or converted into a block of a square shape, and a quantization, a transform or encoding/decoding of residual signal (e.g., residual coefficients) may be performed on the block of the square shape.

For example, a transform type may be determined in a unit of a block of a square shape. Here, the transform type may mean at least one of a transform scheme (e.g., DCT or DST) or a transform mode (e.g., 2D transform mode, 1D transform (vertical/horizontal) mode or a non-transform mode). To do this, it is possible to divide the current block of the non-square shape into sub-blocks of the square shape, and determine the transform type in a unit of a sub-block.

Figure 22:
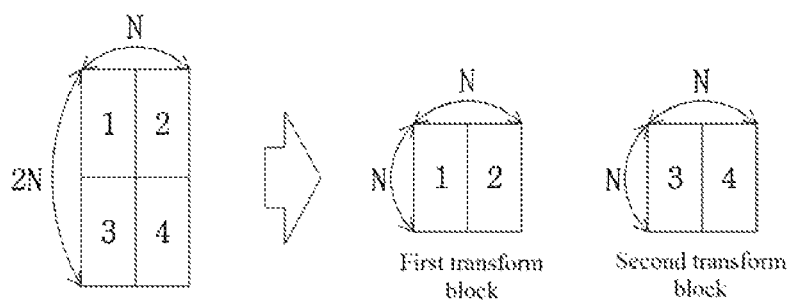
FIG. 22 is a diagram illustrating an example of dividing a current block of a non-square shape into sub-blocks of a square shape.

FIG. 22 is a diagram illustrating an example of dividing a current block of a non-square shape into sub-blocks of a square shape.

If the current block is a block of a non-square shape, the current block may be divided into a plurality of sub-blocks having a square shape as in the example shown in FIG. 22. In FIG. 22, it is illustrated that a block of N×2N type is divided into N×N type sub-blocks.

A transform type may be determined for each divided sub-block. That is, a first sub-transform block corresponding to an upper part of the current block and a second sub-transform block corresponding to a lower part of the current block may be independently transformed such as DCT or DST.

Alternatively, a first transform may be performed on each of a plurality of sub-blocks included in the current block, and then a second transform may be performed on a unit including the plurality of sub-blocks. Here, the first transform and the second transform may be different from each other in at least one of a transform mode, a transform scheme, or a target area of a transform.

As another example, it is possible to generate a block of a square shape by merging the current block of a non-square shape with a neighboring block, and to determine a transform type on the generated block of the square shape. At this time, the current block may be merged with at least one neighboring block adjacent to a left, a right, a top, or a bottom of the current block. The plurality of blocks included in the merged block may have the same transform type.

Alternatively, it is also possible to perform a first transform on the merged block of the square shape, and then to perform a second transform on each of the plurality of blocks included in the merged block of the square shape.

The current block of s non-square shape may be converted into a square shape, and a transform may be performed on the converted current block.

For example, FIGS. 23 to 26 are diagrams illustrating an example of converting a block of a non-square shape into a block of a square shape.

When the current block has a non-square shape, the current block may be converted into a square shape by dividing the current block into sub-blocks based on a predetermined size or a predetermined shape, and rearranging the divided sub-blocks in a predetermined order. Here, the predetermined order may include at least one of a a Z scan, a vertical scan, or a horizontal scan, or a reverse order of the Z scan, the vertical scan, or the horizontal scan. The scan order used to convert the current block may be determined based on at least one of a size, a shape, an encoding mode (e.g., intra mode or inter mode) or an intra prediction mode (e.g., direction or angle of intra prediction mode) of the current block. Alternatively, it is possible to use a predefined order in the encoder/decoder, or to signal information for specifying an order of arrangement of sub-blocks through the bitstream.

Figure 23:
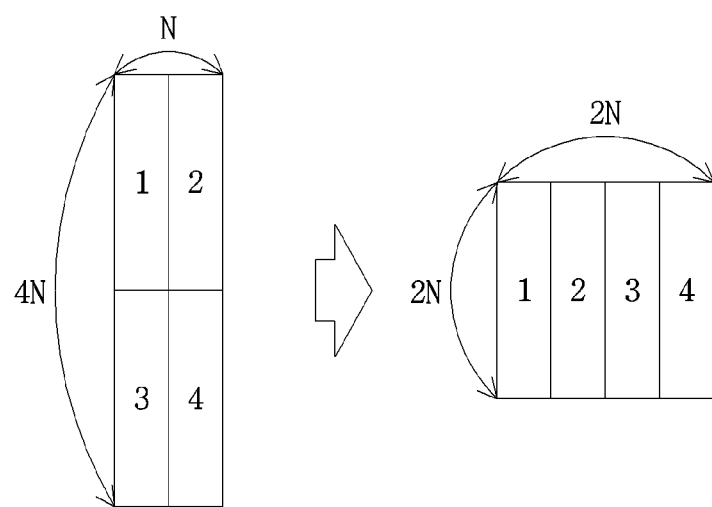
FIGS. 23 to 26 are diagrams illustrating an example of converting a block of a non-square shape into a block of a square-shape.
Figure 24:
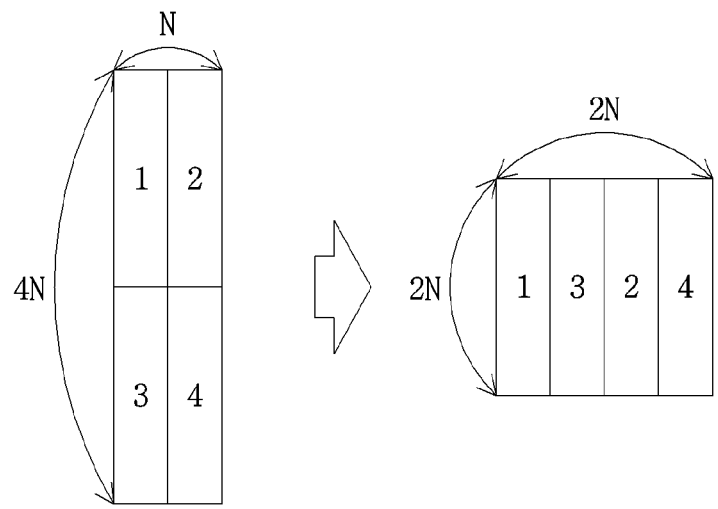

FIGS. 23 and 24 are drawings illustrating an example of converting a block of N×4N type into a block of a square shape.

In order to convert the current block into a square block, a block of N×4N type may be divided into four sub-blocks of the same shape. Thereafter, the divided sub-blocks are arranged in a line in a horizontal direction, thereby generating a square-shaped block.

It is illustrated in FIG. 23 that a block of 2N×2N size is generated by arranging sub-blocks (3, 4) located at a lower part of the current block to a right of sub-blocks (1, 2) located at an upper part of the current block (Z scan order or horizontal scan order being used). It is illustrated in FIG. 24 that a block of 2N×2N size is generated by arranging sub-blocks in a horizontal direction (that is, arranging the sub-blocks in the order of 1, 3, 2, 4) according to a vertical scanning order.

Figure 25:
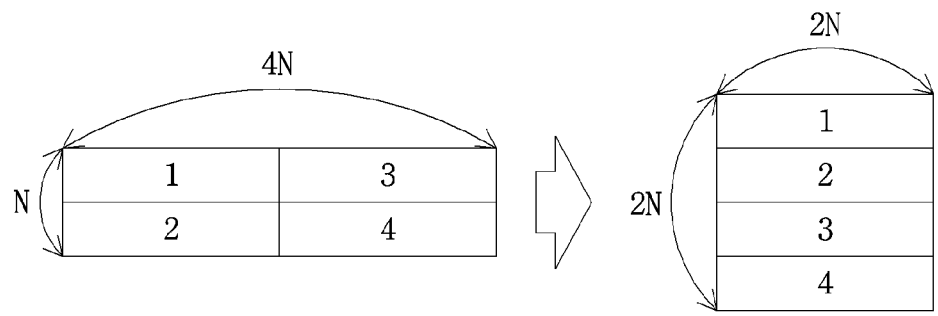
Figure 26:
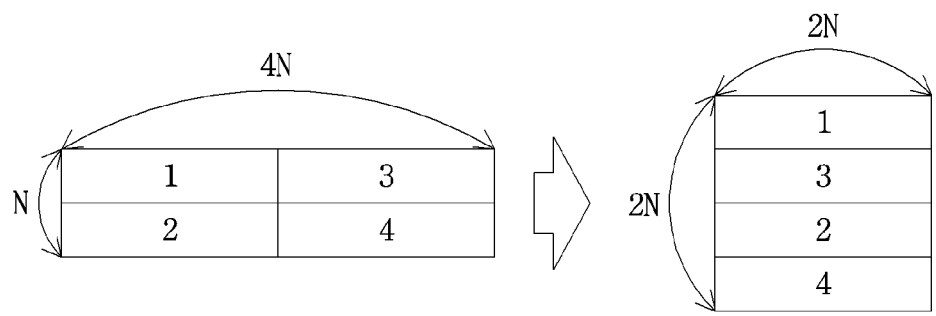

FIGS. 25 and 26 are drawings illustrating an example of converting a block of 4N×N type into a block of a square shape.

In order to convert a current block into a square block, a block of 4N×N shape may be divided into four sub-blocks of the same shape. Subsequently, the divided sub-blocks are arranged in a line in a vertical direction, thereby generating a square-shaped block.

It is illustrated in FIG. 25 that a block of 2N×2N size is generated by arranging sub-blocks (3, 4) located at a right side of the current block to a bottom of sub-blocks (1, 2) located at a left side of the current block (Z scan order or vertical scan order being used). It is illustrated in FIG. 26 that a block of 2N×2N is generated by arranging sub-blocks in a vertical direction (that is, arranging the sub-blocks in the order of 1, 3, 2, 4) according to a horizontal scanning order.

It is illustrated in FIGS. 23 to 26 that the current block is divided into four sub-blocks in order to convert the current block into a square shape. However, it is also possible to divide the current block into a larger number or a fewer number of sub-blocks to convert the current block into a block of the square shape.

After converting the current block into a block of a square shape, it is possible to perform DCT or DST transform on the converted block. Alternatively, it is also possible to convert the current block into a block of a square shape, and then encode residual coefficients by applying a transform skip to the converted block.

As another example, a quantization or a transform may be performed on a block of a non-square shape. However, transform coefficients for the block of the non-square shape in which the quantization or the transformation is completed may be encoded in a unit of a block of a square shape. That is, encoding/decoding of the transform coefficients may performed on a block of a square shape, while the transform or the quantization is performed on a block of a non-square shape.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
    obtaining prediction samples of a current block, the prediction samples of the current block being obtained by performing intra prediction or inter prediction;
    performing an inverse-quantization for the current block;
    determining whether an inverse-transform is skipped for the current block or not;
    when it is determined that the inverse-transform is not skipped for the current block, determining a transform type for the current block;
    obtaining residual samples of the current block by performing the inverse-transform based on the determined transform type; and
    reconstructing the current block based on the prediction samples and the residual samples,
    wherein whether to parse a transform skip flag, indicating whether the inverse-transform is skipped or not, from a bitstream is determined based on a partition type of a coding block including the current block, and
    wherein when the partition type of the coding block represents that the coding block is partitioned into a plurality of partitions in either a vertical direction or a horizontal direction, the transform skip flag is not parsed from the bitstream and it is determined that the inverse-transform is not skipped for the current block.

2. The method of claim 1, wherein whether an asymmetric partitioning type is available for the coding block is determined based on a size of the coding block.

3. A method for encoding a video, the method comprising:
    obtaining prediction samples of a current block, the prediction samples of the current block being obtained by performing intra prediction or inter prediction;
    determining whether a transform is skipped for the current block or not;
    when it is determined that the transform is not skipped for the current block, determining a transform type for the current block;
    performing the transform for the current block based on the determined transform type;
    performing a quantization for the current block; and
    encoding residual coefficients of the current block,
    wherein whether to encode a transform skip flag, indicating whether the transform is skipped or not, into a bitstream is determined based on a partition type of a coding block including the current block, and
    wherein when the partition type of the coding block including the current block represents that the coding block is partitioned into a plurality of partitions in either a vertical direction or a horizontal direction, the transform skip flag is not encoded into the bitstream and the transform is not skipped for the current block.

4. A transmitting apparatus of data for image information, comprising:
    at least one processor configured to obtain a bitstream which comprising information on residual coefficients of a current block; and
    a transmitter configured to transmit the data comprising the bitstream of the image information, wherein the residual coefficients are derived by:
performing a quantization for the current block; and
performing a transform for the current block,
wherein whether a transform skip flag, indicating whether the transform is skipped or not, is included in the bitstream or not is determined based on a partition type of a coding block including the current block, and
wherein when the partition type of the coding block including the current block represents that the coding block is partitioned into a plurality of partitions in either a vertical direction or a horizontal direction, the transform skip flag is not included in the bitstream and the transform is not skipped for the current block.

\* \* \* \* \*